US011889513B2

(12) United States Patent
Liu et al.

(10) Patent No.: US 11,889,513 B2
(45) Date of Patent: Jan. 30, 2024

(54) COMMUNICATION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN); Xu Zhang, Beijing (CN); Leiming Zhang, Beijing (CN); Xiang Gao, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 17/200,359

(22) Filed: Mar. 12, 2021

(65) Prior Publication Data

US 2021/0204260 A1 Jul. 1, 2021

Related U.S. Application Data

(63) Continuation of application No. PCT/CN2019/105777, filed on Sep. 12, 2019.

(30) Foreign Application Priority Data

Sep. 14, 2018 (CN) .......................... 201811072500.0

(51) Int. Cl.
*H04W 72/23* (2023.01)
*H04L 5/00* (2006.01)
(Continued)

(52) U.S. Cl.
CPC ........... *H04W 72/23* (2023.01); *H04L 1/0072* (2013.01); *H04L 5/0053* (2013.01);
(Continued)

(58) Field of Classification Search
CPC ... H04L 1/0013; H04L 1/0025; H04L 1/0053; H04L 1/0072; H04L 5/0035;
(Continued)

(56) References Cited

U.S. PATENT DOCUMENTS

| 11,317,380 B2 * | 4/2022 | Lee ..................... H04L 1/1896 |
| 2016/0013903 A1 | 1/2016 | Kim et al. |
| 2017/0230994 A1 | 8/2017 | You et al. |

FOREIGN PATENT DOCUMENTS

| CN | 101730139 A | 6/2010 |
| CN | 102246449 A | 11/2011 |

(Continued)

OTHER PUBLICATIONS

Extended European Search Report issued in European Application No. 19858801.4 dated Oct. 4, 2021, 12 pages.
(Continued)

*Primary Examiner* — Thomas R Cairns
(74) *Attorney, Agent, or Firm* — Fish & Richardson P.C.

(57) ABSTRACT

This application provides an example communication method and an example apparatus. The method includes a first network device generates first indication information to indicate a first downlink resource. Second indication information indicates a second downlink resource. Because the first indication information may indicate whether the second indication information exists, if a terminal device detects the first indication information in the first time unit, and the first indication information indicates that the second indication
(Continued)

information does not exist in the first time unit, the terminal device may stop a blind detection process on the second indication information in advance.

15 Claims, 10 Drawing Sheets

(51) Int. Cl.
*H04W 72/1273* (2023.01)
*H04L 1/00* (2006.01)
*H04W 72/0453* (2023.01)

(52) U.S. Cl.
CPC ....... *H04W 72/1273* (2013.01); *H04L 1/0013* (2013.01); *H04W 72/0453* (2013.01)

(58) Field of Classification Search
CPC ... H04L 5/0053; H04L 5/0091; H04L 5/0094; H04W 72/0446; H04W 72/0453; H04W 72/0466; H04W 72/1273; H04W 72/23–232
See application file for complete search history.

(56) References Cited

FOREIGN PATENT DOCUMENTS

| | | |
|---|---|---|
| CN | 102347919 A | 2/2012 |
| CN | 104620512 A | 5/2015 |
| CN | 106535251 A | 3/2017 |
| CN | 107682129 A | 2/2018 |
| CN | 107889268 A | 4/2018 |
| CN | 108141330 A | 6/2018 |
| CN | 108270509 A | 7/2018 |
| CN | 108282252 A | 7/2018 |
| CN | 108632960 A | 10/2018 |
| WO | 2018127097 A1 | 7/2018 |

OTHER PUBLICATIONS

Huawei, HiSilicon, "Discussion on codebook based UL MIMO transmission," 3GPP TSG RAN WGI Meeting #88, R1-1703338, Athens, Greece, Feb. 13-17, 2017, 4 pages.

Qualcomm, "E-mail discussions on 2-stage DCI for NR," TSG-RAN WG1 #88, R1-1702629, Athens, Greece, Feb. 13-17, 2017, 12 pages.

* cited by examiner

| Whether two pieces of DCI exist | CRC mask < $x_{rnti,0}, x_{rnti,1}, ..., x_{rnti,15}$> of DCI |
|---|---|
| Two pieces of DCI exist | <0, 0, 0, 0, 0, 0, 0, 0, 0, 0, 0, 0, 0, 0, 0, 0> |
| Only one piece of DCI exists | <1, 1, 1, 1, 1, 1, 1, 1, 1, 1, 1, 1, 1, 1, 1, 1> |

| Whether two pieces of DCI exist | CRC mask < $x_{rnti,0}, x_{rnti,1}, ..., x_{rnti,15}$> of DCI |
|---|---|
| Two pieces of DCI exist | <0, 1, 0, 1, 0, 1, 0, 1, 0, 1, 0, 1, 0, 1, 0, 1> |
| Only one piece of DCI exists | <1, 0, 1, 0, 1, 0, 1, 0, 1, 0, 1, 0, 1, 0, 1, 0> |

COMMUNICATION METHOD AND APPARATUS

CROSS-REFERENCE TO RELATED APPLICATIONS

This application is a continuation of International Application No. PCT/CN2019/105777, filed on Sep. 12, 2019, which claims priority to Chinese Patent Application No. 201811072500.0, filed on Sep. 14, 2018. The disclosures of the aforementioned applications are hereby incorporated by reference in their entireties.

TECHNICAL FIELD

The application relates to the field of wireless communications technologies, and in particular, to a communication method and apparatus.

BACKGROUND

During downlink transmission of a new radio access technology (NR) system of the 3rd generation partnership project (3GPP), a terminal device (LIE) may simultaneously communicate with a plurality of network devices (for example, base stations) in a coordinated multipoint transmission (CoMP) mode. The plurality of network devices form a coordinating cluster, coordination policy information may be exchanged between the network devices that are in the coordinating cluster, to achieve an objective of coordinated transmission.

A serving base station may exist in the coordinating cluster, and is configured to: make a decision for data communication scheduling on the UE, determine time-frequency resources of a control channel and a data channel of the UE based on the scheduling decision, send downlink control information (DCI) on a physical downlink control channel (PDCCH), send data on a physical uplink shared channel (PUSCH)/physical downlink shared channel (PDSCH), and the like. A base station other than the serving base station in the coordinating cluster is referred to as a cooperative base station, and is configured to communicate with the UE based on the scheduling decision of the serving base station, for example, send the DCI on the PDCCH based on the scheduling decision of the serving base station, and send the data on the PUSCH/PDSCH. The base station transmits downlink data on the PDSCH in a form of a codeword. Each codeword corresponds to an independent modulation and coding method, and each codeword corresponds to an independent data transmission layer.

In the CoMP transmission mode, scheduling of the PDSCH may be indicated by using one piece of DCI or two pieces of DCI. If the scheduling of the PDSCH is indicated by using one piece of DCI, as shown in FIG. 1, a base station on the left side may serve as a serving base station to make a decision for scheduling the UE and send the DCI. The DCI may include a time-frequency resource allocation indication and a transmission manner indication of the downlink data on which modulation and coding are performed in a form of one codeword or two codewords. If the scheduling of the PDSCH is indicated by using two pieces of DCI, as shown in FIG. 2, two base stations each may send one piece of DCI, and each piece of DCI corresponds to a time-frequency resource allocation indication and a transmission manner indication of at least one codeword.

Currently, when scheduling the PDSCH, the base station does not notify the UE of a quantity of pieces of DCI used for scheduling the PDSCH. Therefore, the UE always needs to blindly detect two pieces of DCI until a maximum quantity of times of blind detection is reached. Consequently, complexity of the blind detection performed by the UE and power consumption caused by the blind detection of the DCI increase. Therefore, how to reduce the complexity of the blind detection of the DCI performed by the UE is an urgent problem to be resolved.

SUMMARY

Embodiments of this application provide a communication method and apparatus, so that a terminal device stops an unnecessary blind detection process in advance. This reduces blind detection complexity and power consumption of the terminal device.

According to a first aspect, an embodiment of this application provides a communication method. The method includes: A first network device generates first indication information. The first indication information is used to indicate a first downlink resource, and indicate whether second indication information exists in a first time unit. The second indication information is used to indicate a second downlink resource. The first downlink resource and the second downlink resource are used to carry downlink data. The first network device sends the first indication information in the first time unit.

According to a second aspect, an embodiment of this application provides another communication method. The method includes: A terminal device detects first indication information in a first time unit. The first indication information is used to indicate a first downlink resource, and indicate whether second indication information exists in the first time unit. The second indication information is used to indicate a second downlink resource. The first downlink resource and the second downlink resource are used to carry downlink data. If the terminal device detects that the first indication information indicates that the second indication information does not exist in the first time unit, the terminal device stops detecting the second indication information in the first time unit.

It can be learned that, because the first indication information sent by the first network device to the terminal device in the first time unit may be used to indicate whether the second indication information exists in the first time unit, when the terminal device detects the first indication information, if the first indication information indicates that the second indication information does not exist in the first time unit, the terminal device may stop a blind detection process on the second indication information in advance. This effectively reduces blind detection complexity of the terminal device, allows the terminal device to perform fast PDSCH demodulation, and avoids a technical problem in the conventional technology of high power consumption caused by always blindly detecting two pieces of indication information.

In a possible design, if the first indication information indicates that the second indication information exists in the first time unit, the first network device sends the second indication information in the first time unit. The second indication information is used to indicate that the first indication information exists in the first time unit. Correspondingly, the terminal device further detects the second indication information in the first time unit.

In this embodiment of this application, if the first network device sends the first indication information and the second indication information in the first time unit, the first indication information indicates that the second indication information exists in the first time unit. Correspondingly, the second indication information also indicates that the first indication information exists in the first time unit. Because a sequence of blindly detecting the first indication information and the second indication information by the LIE is unknown to the first network device, regardless of either indication information of the first indication information and the second indication information is first detected by the terminal device, the first detected indication information can always indicate that the other indication information exists, so as to prompt that the terminal device needs to detect the two pieces of indication information. In this way, when the first indication information indicates that the second indication information does not exist, the terminal device may stop detecting the second indication information in advance, thereby reducing an actual quantity of times of blind detection.

For example, the terminal device detects the first indication information and the second indication information in the first time unit based on search space configuration information of the first indication information and search space configuration information of the second indication information. Assuming that the terminal device first detects either of the first indication information and the second indication information, the terminal device may determine, based on either of the detected first indication information and second indication information, whether another piece of indication information that is different from either of the first indication information and the second indication information exists. When another piece of indication information that is different from either of the first indication information and the second indication information exists, the terminal device continues a detection process on the indication information based on corresponding search space configuration information. When another piece of indication information that is different from either of the first indication information and the second indication information does not exist, the terminal device stops a detection process on the indication information.

In this embodiment of this application, there may be a plurality of possible implementations in which the first indication information indicates "whether the second indication information exists in the first time unit". In a possible implementation, the first indication information includes at least two codeword information fields, and each of the at least two codeword information fields is used to indicate whether a corresponding codeword is enabled. If all of codewords corresponding to the at least two codeword information fields that are in the first indication information are enabled, the first indication information is used to indicate that the second indication information does not exist. If a part of codewords corresponding to the at least two codeword information fields that are in the first indication information are enabled, the first indication information is used to indicate that the second indication information exists.

In this way, whether the second indication information exists in the first time unit may be indicated based on an enabling status of the codeword corresponding to the codeword information field that is in the first indication information, thereby effectively avoiding extra signaling overheads caused by adding a new field to the indication information, and reducing blind detection complexity of the terminal device. In addition, when a transmission mode in which a single base station transmits two codewords is used for downlink data transmission, because only one piece of DCI needs to be detected and decoded and there is no need to wait for complete detection and decoding to obtain information carried by two pieces of DCI, the terminal device can be supported in performing fast data demodulation.

In another possible implementation, the first indication information includes a demodulation reference signal DMRS port indication field and at least two codeword information fields, and each of the at least two codeword information fields is used to indicate whether a corresponding codeword is enabled. If all of codewords corresponding to the at least two codeword information fields that are in the first indication information are enabled, and a status value of the DMRS port indication field is within a first preset range, the first indication information is used to indicate that the second indication information exists. If all of codewords corresponding to the at least two codeword information fields that are in the first indication information are enabled, and a status value of the DMRS port indication field is within a second preset range, the first indication information is used to indicate that the second indication information does not exist. If a part of codewords corresponding to the at least two first codeword information fields that are in the first indication information are enabled, the second indication information is used to indicate that the first indication information does not exist.

In this way, whether the second indication information exists in the first time unit may be indicated based on an enabling status of the codeword corresponding to the codeword information field that is in the first indication information and with reference to the status value indicated by the DMRS port indication field, thereby effectively avoiding extra signaling overheads caused by adding a new field to the indication information, and reducing blind detection complexity of the terminal device. In addition, when a transmission mode in which a single base station transmits two codewords is used for downlink data transmission, because only one piece of DCI needs to be detected and decoded and there is no need to wait for complete detection and decoding to obtain information carried by two pieces of DCI, the terminal device can be supported in performing fast data demodulation.

In a possible design, if all of codewords corresponding to the at least two codeword information fields are enabled, a quantity of DMRS ports corresponding to the status value that is of the DMRS port indication field and that is within the first preset range is less than or equal to a first threshold, and a quantity of DMRS ports corresponding to the status value that is of the DMRS port indication field and that is within the second preset range is greater than the first threshold. In this way, one piece of DCI can be supported to indicate a transmission mode in which a single base station transmits one or two codewords, and two pieces of DCI can be supported to indicate a transmission mode in which two base stations transmit at least two codewords. In this way, only in the transmission mode in which two base stations transmit at least two codewords, the terminal device needs to blindly detect two pieces of DCI. This reduces blind detection complexity of the terminal device and allows the terminal device to perform fast data demodulation. The foregoing transmission mode may be dynamically switched.

Further, if all of codewords corresponding to the at least two codeword information fields are enabled, the quantity of DMRS ports corresponding to the status value that is of the DMRS port indication field and that is within the first preset range is less than or equal to the first threshold, and DMRS port numbers corresponding to the status value correspond to a same CDM group.

In a possible design, each of the at least two codeword information fields includes a modulation and coding scheme MCS field and a redundancy version RV field. When a status value of the MCS field is within a third preset range and a status value of the RV field is within a fourth preset range, the codeword information field is used to indicate that a codeword corresponding to the codeword information field is disabled; otherwise, the codeword corresponding to the codeword information field is enabled.

In still another possible implementation, if a mask of a cyclic redundancy check CRC bit corresponding to the first indication information is a first scrambling sequence, the first indication information is used to indicate that the second indication information exists. If a mask of a CRC bit corresponding to the first indication information is a second scrambling sequence, the first indication information is used to indicate that the second indication information does not exist. In this way, the mask of the CRC bit corresponding to the first indication information may be used to carry an indication of whether the second indication information exists in the first time unit, thereby effectively avoiding extra signaling overheads caused by adding a new field to the indication information, and reducing blind detection complexity of the terminal device.

In yet another possible implementation, if the first indication information meets a first information format, the first indication information may be used to indicate that the second indication information does not exist, and the first information format is a format with a minimum quantity of bits in a plurality of DCI formats used for scheduling downlink data transmission, and/or if the first indication information meets a second information format, the first indication information may be used to indicate that the second indication information exists, and the second information format is a format that is in a plurality of DCI formats used for scheduling downlink data transmission and whose quantity of bits is greater than that of the first information format. In this way, the information format that the first indication information meets may be used to indicate whether the second indication information exists in the first time unit, thereby effectively avoiding extra signaling overheads caused by adding a new field to the indication information, and reducing blind detection complexity of the terminal device.

Similarly, in this embodiment of this application, there may be a plurality of possible implementations in which the second indication information indicates that "the first indication information exists in the first time unit". In a possible implementation, the second indication information includes at least two codeword information fields, and each of the at least two codeword information fields is used to indicate whether a corresponding codeword is enabled. If a part of codewords corresponding to the at least two codeword information fields that are in the second indication information are enabled, the second indication information is used to indicate that the first indication information exists. In this way, that the first indication information exists in the first time unit may be indicated based on an enabling status of the codeword corresponding to the codeword information field that is in the second indication information, thereby effectively avoiding extra signaling overheads caused by adding a new field to the indication information, and reducing blind detection complexity of the terminal device. In addition, when a transmission mode in which a single base station transmits two codewords is used for downlink data transmission, because only one piece of DCI needs to be detected and decoded and there is no need to wait for complete detection and decoding to obtain information carried by two pieces of DCI, the terminal device can be supported in performing fast data demodulation.

In another possible implementation, the second indication information includes a demodulation reference signal DMRS port indication field and at least two codeword information fields, and each of the at least two codeword information fields is used to indicate whether a corresponding codeword is enabled. If all of codewords corresponding to the at least two codeword information fields that are in the second indication information are enabled, and a status value of the DMRS port indication field is within a first preset range, the second indication information is used to indicate that the first indication information exists. In this way, that the first indication information exists in the first time unit may be indicated based on an enabling status of the codeword corresponding to the codeword information field that is in the second indication information and with reference to the status value indicated by the DMRS port indication field, thereby effectively avoiding extra signaling overheads caused by adding a new field to the indication information, and reducing blind detection complexity of the terminal device. In addition, when a transmission mode in which a single base station transmits two codewords is used for downlink data transmission, because only one piece of DCI needs to be detected and decoded and there is no need to wait for complete detection and decoding to obtain information carried by two pieces of DCI, the terminal device can be supported in performing fast data demodulation.

In a possible design, if all of codewords corresponding to the at least two codeword information fields are enabled, a quantity of DMRS ports corresponding to the status value that is of the DMRS port indication field and that is within the first preset range is less than or equal to a first threshold, and a quantity of DMRS ports corresponding to the status value that is of the port indication field and that is within the second preset range is greater than the first threshold. In this way, one piece of DCI can be supported to indicate a transmission mode in which a single base station transmits one or two codewords, and two pieces of DCI can be supported to indicate a transmission mode in which two base stations transmit at least two codewords. In this way, only in the transmission mode in which two base stations transmit at least two codewords, the terminal device needs to blindly detect two pieces of DCI. This reduces blind detection complexity of the terminal device and allows the terminal device to perform fast data demodulation.

Further, if all of codewords corresponding to the at least two codeword information fields are enabled, the quantity of DMRS ports corresponding to the status value that is of the DMRS port indication field and that is within the first preset range is less than or equal to the first threshold, and DMRS port numbers corresponding to the status value correspond to a same CDM group.

In a possible design, each of the at least two codeword information fields includes a modulation and coding scheme MCS field and a redundancy version RV field. When a status value of the MCS field is within a third preset range and a status value of the 1 W field is within a fourth preset range, the codeword information field is used to indicate that a codeword corresponding to the codeword information field is disabled; otherwise, the codeword corresponding to the codeword information field is enabled.

In still another possible implementation, if a mask of a cyclic redundancy check CRC bit corresponding to the second indication information is a first scrambling sequence, the first indication information is used to indicate that the second indication information exists. In this way, the mask of the CRC bit corresponding to the second indication information may be used to carry an indication that the first indication information exists in the first time unit, thereby effectively avoiding extra signaling overheads caused by adding anew field to the indication information, and reducing blind detection complexity of the terminal device.

In yet another possible implementation, if the second indication information meets a second information format, the second indication information may be used to indicate that the first indication information exists, and the second information format is a format that is in a plurality of DCI formats used for scheduling downlink data transmission and whose quantity of bits is greater than that of a first information format. The first information format is a format with a minimum quantity of bits in the plurality of DCI formats used for scheduling the downlink data transmission. In this way, the information format that the second indication information meets may be used to indicate that the first indication information exists in the first time unit, thereby effectively avoiding extra signaling overheads caused by adding a new field to the indication information, and reducing blind detection complexity of the terminal device.

In a possible design, both the first indication information and the second indication information include a first field. The first network device may further send third indication information. The third indication information is used to indicate that content indicated by the first field that is in the first indication information is the same as content indicated by the first field that is in the second indication information. The terminal device may further receive third indication information. The terminal device performs quick decoding on the first indication information and the second indication information based on the first field, or checks correctness of decoding the first indication information and the second indication information.

According to a third aspect, an embodiment of this application provides a network device. The network device has a function of implementing the network device in any one of the first aspect or the possible designs of the first aspect. The function may be implemented by hardware, or may be implemented by hardware by executing corresponding software. The hardware or the software includes one or more modules corresponding to the function.

In a possible design, a structure of the network device includes a processing module and a transceiver module. The processing module is configured to support the network device in executing a corresponding function in any one of the first aspect or the designs of the first aspect. The transceiver module is configured to support communication between the network device and another communications device. The network device may further include a storage module. The storage module is coupled to the processing module, and stores a program instruction and data that are necessary for the network device. In an example, the processing module may be a processor, a communications module may be a transceiver, and the storage module may be a memory.

According to a fourth aspect, an embodiment of this application provides a terminal device. The terminal device has a function of implementing the terminal device in any one of the second aspect or the possible designs of the second aspect. The function may be implemented by hardware, or may be implemented by hardware executing corresponding software. The hardware or the software includes one or more modules corresponding to the function.

In a possible design, a structure of the terminal device includes a processing module and a transceiver module. The processing module is configured to support the terminal device in executing a corresponding function in any one of the second aspect or the designs of the second aspect. The transceiver module is configured to support communication between the terminal device and another communications device. The terminal device may further include a storage module. The storage module is coupled to the processing module, and stores a program instruction and data that are necessary for the terminal device. In an example, the processing module may be a processor, a communications module may be a transceiver, and the storage module may be a memory.

According to a fifth aspect, an embodiment of this application provides a chip. The chip is coupled to a memory, and is configured to read and execute a software program stored in the memory, to implement the method in any possible design of the first aspect or implement the method in any possible design of the second aspect.

According to a sixth aspect, an embodiment of this application provides a computer-readable storage medium. The computer-readable storage medium stores a computer-readable instruction. When a computer reads and executes the computer-readable instruction, the computer is enabled to perform the method in any possible design of the first aspect or perform the method in any possible design of the second aspect.

According to a seventh aspect, an embodiment of this application provides a computer program product. When a computer reads and executes the computer program product, the computer is enabled to perform the method in any possible design of the first aspect, or perform the method in any possible design of the second aspect.

According to an eighth aspect, an embodiment of this application provides a communications system. The system includes a terminal device and a network device, the network device may be configured to perform the method in any one of the first aspect or the possible designs of the first aspect, and the terminal device may be configured to perform the method in any one of the second aspect or the possible designs of the second aspect.

DESCRIPTION OF EMBODIMENTS

To make the objectives, technical solutions, and advantages of this application clearer, the following describes embodiments of this application in detail with reference to the accompanying drawings in this specification. It should be noted that, terms used in implementations of this application are merely intended to explain specific embodiments of this application, and are not intended to limit this application.

Figure 1:
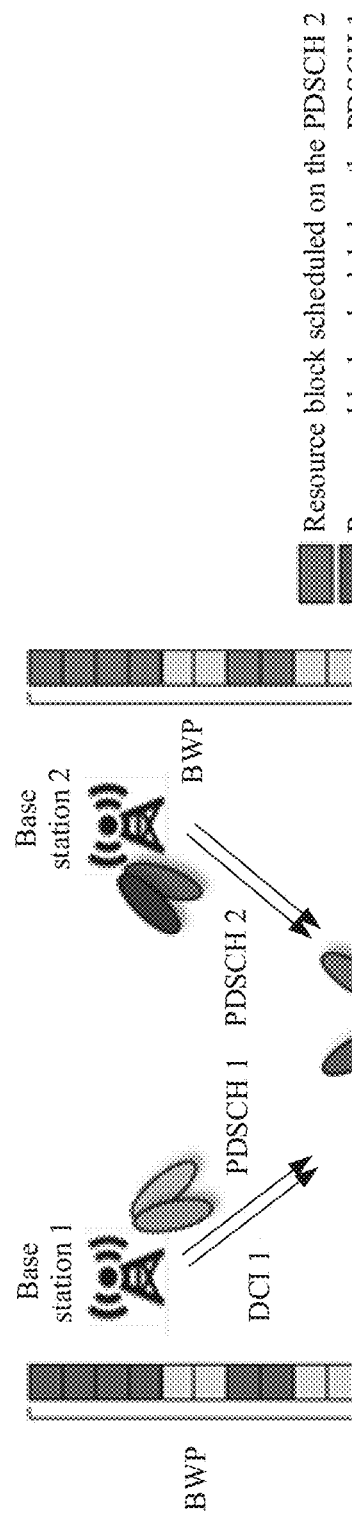
FIG. 1 shows an application scenario in which PDSCH scheduling is indicated by using one piece of DCI in the conventional technology.
Figure 2:
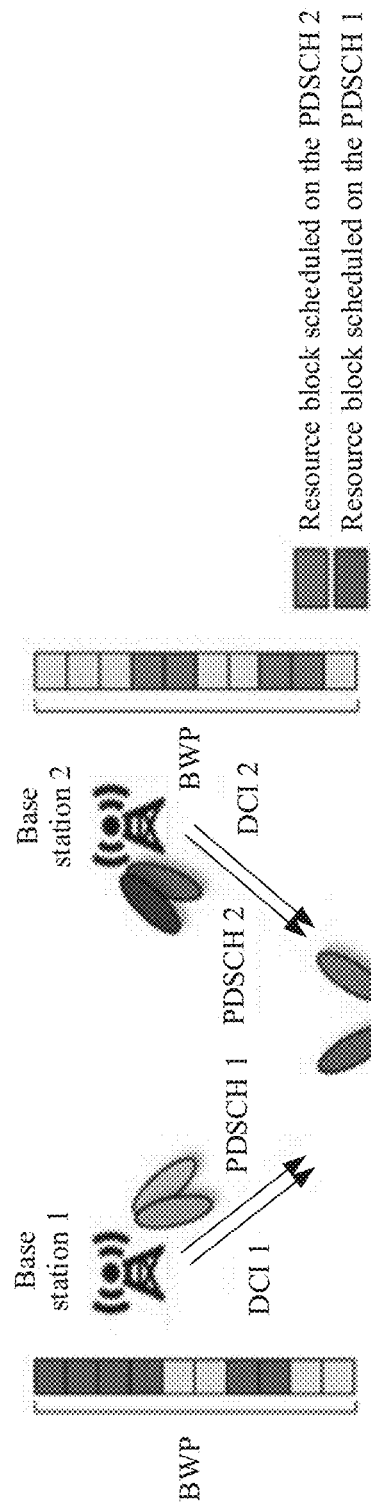
FIG. 2 shows an application scenario in which PDSCH scheduling is indicated by using two pieces of DCI in the conventional technology.
Figure 3:
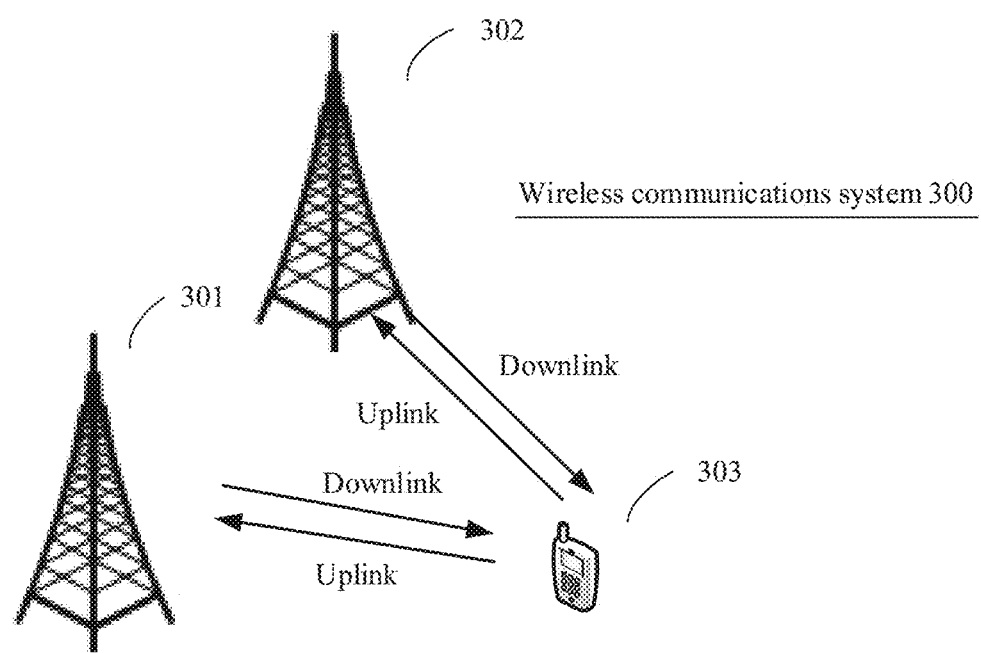
FIG. 3 is a schematic diagram of a network architecture to which an embodiment of this application is applicable.

FIG. 3 is a schematic diagram of a network architecture to which an embodiment of this application is applicable. The network architecture includes a first network device 301, a second network device 302, and a terminal device UE 303. The first network device and the second network device form a coordinating cluster, to jointly/coordinately transmit data to the terminal device 303, and certainly, the coordinating cluster may further include another network device such as a third network device or a fourth network device. This is not specifically limited in this embodiment of this application.

It should be understood that the network architecture in this embodiment of this application may be used in various communications systems, for example, a global system for mobile communications (GSM), a code division multiple access (CDMA) system, or a wideband code division multiple access (WCDMA) system, a general packet radio service (GPRS), a long term evolution (LTE) system, an LIE frequency division duplex (FDD) system, an LTE time division duplex (TDD) system, a universal mobile telecommunications system (UMTS), a 5G communications system, and a 6G communications system.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device, an access terminal device, a user terminal device, a user agent, a user device, or the like. For example, the terminal device may include a mobile phone (which is also referred to as a "cellular" phone), a computer having a mobile terminal device, a portable, pocket-sized, handheld, computer built-in, or vehicle-mounted mobile apparatus, and a smart wearable device. For example, the terminal device may be a device such as a personal communications service (PCS) phone, a cordless phone, a session initiation protocol (session initiation protocol, SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, a radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device, for example, including a base station (for example, an access point), may be a device that is in an access network and that communicates with a wireless terminal device over an air interface through one or more cells. The network device may be configured to mutually convert a received over-the-air frame and an internet protocol (IP) packet and serve as a router between the terminal device and a rest part of the access network, where the rest part of the access network may include an IP network. The network device may coordinate attribute management of the air interface. For example, the network device may include an evolved NodeB (NodeB or eNB or e-NodeB, evolutional Node B) in a long term evolution (LTE) system or an LTE-advanced (LTE-A) system, may include a next generation NodeB (gNB) in a fifth generation (5G) mobile communication technology new radio (NR) system, or may include a centralized unit (CU) and a distributed unit (DU) in a cloud access network (Cloud-RAN) system. This is not limited in the embodiments of this application.

(3) The terms "system" and "network" may be used interchangeably in the embodiments of this application. "A plurality of pieces" means two or more. In view of this, "a plurality of pieces" may also be understood as "at least two pieces" in the embodiments of this application. "At least two pieces" may be understood as two pieces or more pieces, for example, two pieces, three pieces, or more pieces. "At least one piece" may be understood as one piece or more pieces, for example, one piece, two pieces, or more pieces. Similarly, descriptions such as "a plurality of" are understood in a similar way. The term "and/or" describes an association relationship for describing associated objects and represents that three relationships may exist. For example, A and/or B may represent the following three cases: Only A exists, both A and B exist, and only B exists. In addition, the character "/", unless otherwise specified, usually indicates an "or" relationship between the associated objects.

Figure 4:
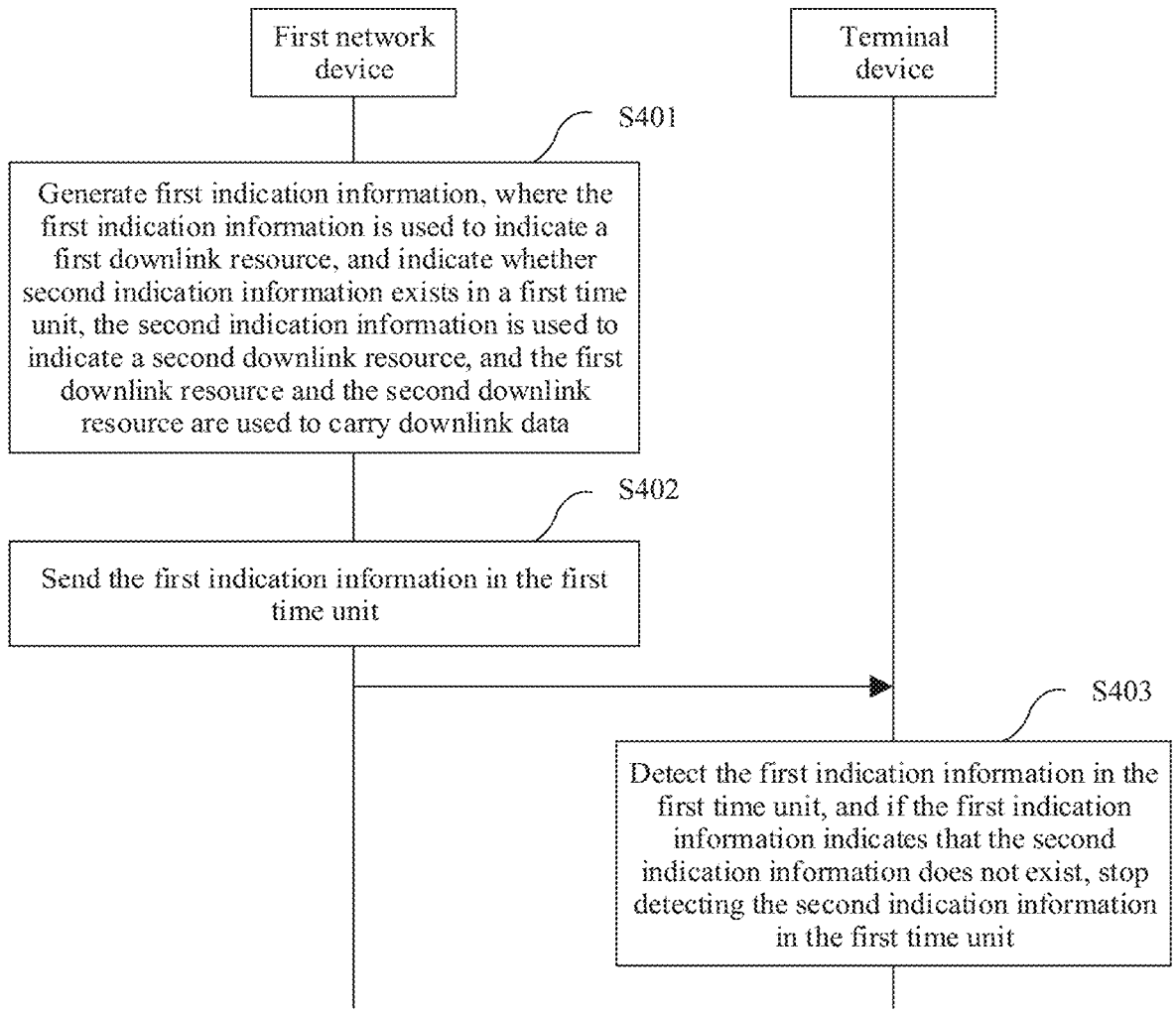
FIG. 4 is a schematic flowchart of a communication method according to an embodiment of this application.

It should be understood that in the following descriptions, terms such as "first" and "second" are merely intended for purposes of description, and should not be understood as an indication or implication of relative importance, and cannot be understood as an indication or implication of a sequence. Based on the foregoing network structures, FIG. 4 is a schematic flowchart of a communication method according to an embodiment of this application. Referring to FIG. 4, the method specifically includes the following steps.

Step S401: A first network device generates first indication information, where the first indication information is used to indicate a first downlink resource, and indicate whether second indication information exists in a first time unit; the second indication information is used to indicate a second downlink resource; and the first downlink resource and the second downlink resource are used to carry downlink data.

Step S402: The first network device sends the first indication information to the terminal device in the first time unit.

Step S403: The terminal device detects the first indication information in the first time unit. If the detected first indication information indicates that the second indication information does not exist in the first time unit, the terminal device stops detecting the second indication information in the first time unit.

It can be learned that, because the first indication information sent by the first network device in the first time unit may be used to indicate whether the second indication information exists in the first time unit, when the terminal device detects the first indication information, if the first indication information is the first piece of indication information actually detected by the terminal device, and the first indication information indicates that the second indication information does not exist in the first time unit, the terminal device may stop a blind detection process on the second indication information in advance; in other words, a quantity times of the blind detection on the second indication information does not need to reach a predefined maximum quantity of times of blind detection. This effectively reduces blind detection complexity of the terminal device, allows the terminal device to perform fast PDSCH demodulation, and avoids a technical problem in the conventional technology of high power consumption caused by always blindly detecting two pieces of indication information.

Before the method steps in this embodiment of this application are described in detail, it should be noted that this embodiment of this application is described by using an example in which a protocol specifies that a maximum of two codewords are transmitted, and correspondingly, the network device configures, by using higher layer signaling, the terminal device to detect a maximum of two pieces of DCI. It should be understood that, with continuous enhancement of data processing capabilities of the network device and the terminal device, a future communications system may also support transmitting more codewords. Therefore, in this case, further extension may be performed based on this embodiment of this application, so that the terminal device can learn of a quantity of pieces of to-be-detected DCI, thereby stopping an unnecessary DCI blind detection process in time, and reducing detection power consumption of the terminal device.

In specific implementation of step S401, the first network device is any network device in a coordinating cluster. For example, the network device is a base station, and the coordinating cluster includes a plurality of base stations. The network device may be a serving base station in the coordinating cluster, or may be a cooperative base station in the coordinating cluster. This is not specifically limited in this embodiment of this application.

The first indication information and the second indication information are indication information that is sent by the first network device in the first time unit and that is used to indicate a downlink resource carrying downlink data. Specifically, the first indication information may be first DCI used for downlink data scheduling. The first DCI is used to indicate the first downlink resource allocated by the first network device to the terminal device, and indicate whether the second indication information exists in the first time unit. The second indication information may be second DCI used for downlink data scheduling. The second DCI is used to indicate a second downlink resource allocated by the first network device to the terminal device. The first downlink resource and the second downlink resource occupy a same time unit, that is, the first time unit, in time domain. In other words, when the terminal device transmits and receives downlink data by using the first downlink resource and the second downlink resource, data transmission performed on the first downlink resource and data transmission performed on the second downlink resource occur at the same time (or may be approximately considered as occur at the same time). The first downlink resource and the second downlink resource may also occupy different time units in time domain. Time units occupied by the first downlink resource and the second downlink resource in time domain are respectively determined by using time domain resources indicated by the first DCI and the second DCI.

The first DCI may include at least two codeword information fields, and each of the at least two codeword information fields is used to indicate whether a corresponding codeword is enabled. Similarly, the second DCI may include at least two codeword information fields, and each of the at least two codeword information fields is used to indicate whether a corresponding codeword is enabled.

It should be noted that, in this embodiment of this application, each codeword information field in a first codeword information field and/or a second codeword information field may correspond to one codeword, or may correspond to a plurality of codewords. In a current application scenario, one codeword information field usually corresponds to one codeword, and a current communications protocol supports transmitting only a maximum quantity of codewords. Both the first codeword information field and/or the second codeword information field may include a plurality of codeword information fields, and each codeword information field may correspond to one codeword. Therefore, this embodiment of this application is described by using an example in which one codeword information field corresponds to one codeword, and one piece of DCI includes two codeword information fields. Details are not described subsequently.

In this embodiment of this application, one codeword may be understood as a group of data bits carried on a downlink resource indicated by the network device. The network device may indicate data of each codeword in an independent modulation and coding manner and by using the codeword information field in the DCI. For example, if the first DCI includes two codeword information fields, and the two codeword information fields respectively correspond to two codewords, if both the two codewords are enabled, it indicates that the network device configures two independent modulation and coding manners for the downlink data transmitted on the first downlink resource; or if only one codeword is enabled, it indicates that the network device configures one modulation and coding manner for the downlink data transmitted on the first downlink resource. In addition, each codeword corresponds to an independent transport layer, and also corresponds to a maximum transport layer value. This is because when a quantity of transport layers is relatively large, a channel state difference of data at each layer is relatively large, and using a same modulation and coding manner may cause a relatively large performance loss. Consequently, a plurality of codewords need to be used to transmit data with a relatively large quantity of transport layers.

More specifically, the DCI in this embodiment of this application may have two possible formats: format 1_1 and format 1-0. Format 1_1 is a common DCI format used for downlink grant (scheduling a PDSCH), and the DCI format specifically includes the following fields:

DCI format indication information: 1 bit, used to indicate downlink DCI or uplink DCI.
Carrier indicator (CI): 0 or 3 bits.
Bandwidth part (BWP) indication: 0, 1, or 2 bits, used to indicate that an active BWP is used for PDSCH and PDCCH transmission
Frequency domain resource location indication: $N_{RBG}$ bits, where $N_{RBG}$ indicates that the active BWP is divided into $N_{RBG}$ bandwidths by using a resource block group (RBG) as a granularity, and 1 bit is used to indicate whether each bandwidth is allocated to the UE to receive the PDSCH, that is, a bitmap indication method.
Time domain resource location indication information: 0, 1, 2, 3, or 4 bits, used to indicate a time domain resource location of the PDSCH.
Mapping from a virtual resource block (virtual resource block, VRB) to a physical resource block (PRB): 0 or 1 bit, used to indicate whether frequency-domain interleaving is performed on the PDSCH.
PRB bundling size indicator: 0 or 1 bit, used to indicate a size of PRB bundling of the PDSCH.
Rate matching indicator: 0, 1, or 2 bits, used to indicate a rate matching resource set for the PDSCH.
Zero power channel state information reference signal (ZP CSI-RS) triggering: used to indicate to trigger a ZP CSI-RS resource set used to perform rate matching for the PDSCH.
For a transport block (TB) 1:
    Modulation and coding scheme (modulation and coding scheme, MCS): 5 bits.
    New data indicator (NDI): 1 bit, used to indicate whether data carried on the PDSCH is newly transmitted data or retransmitted data.
    Redundancy version (1 W): 2 bits.
For a transport block (TB) 2:
    Modulation and coding scheme MCS: 5 bits.
    New data indicator NDI: 1 bit, used to indicate whether data carried on the PDSCH is newly transmitted data or retransmitted data.
    Redundancy version RV: 2 bits.
Number of hybrid automatic repeat request (HARQ) processes.
Downlink assignment indicator (DAI): 0, 2, or 4 bits, used to indicate a count of HARQs.
Transmission power control command of a scheduled PUCCH: 2 bits, used to indicate PUCCH transmission power adjustment.
PUCCH resource indication: 3 bits, used to indicate an uplink PUCCH resource used for a HARQ feedback related to the PDSCH.
PDSCH-to-HARQ feedback time sequence indicator: 0, 1, 2, or 3 bits.
Demodulation reference signal (DMRS) port indicator: 4, 5, or 6 bits, used to indicate an antenna port used by the PDSCH and a corresponding DMRS. Currently, a maximum quantity of orthogonal DMRS ports supported is 12. Different DMRS ports are used to distinguish data at different layers, and different DMRS ports correspond to different time-frequency resource locations and precoding matrices. Therefore, the base station needs to notify the UE of DMRS port numbers and a quantity of DMRS ports that correspond to a currently received PDSCH, so that the UE can receive a corresponding PDSCH based on a correct DMRS. A DMRS antenna port indicator includes an indication of "a CDM group that does not carry date", and values 1, 2, and 3 indicated by the indication respectively correspond to CDM groups {0}, {0, 1}, and {0, 1, 2}. For example, when the indication of "CDM group that does not carry data" is 1, it means that a CDM group {1, 2} carries PDSCH data, and the UE needs to receive the PDSCH on a corresponding time-frequency resource, while the CDM group 0 does not carry the PDSCH data, and the UE does not need to receive the PDSCH on the corresponding time-frequency resource.
Transmission configuration indication: 0 or 3 bits, used to indicate quasi co-location (QCL) assumption information and receive beam information of the PDSCH and a corresponding DMRS.
SRS request: 2 or 3 hits, used to indicate to trigger aperiodic SRS sending.
Transmission information of a code block group (CBG): 0, 2, 4, 6, or 8 bits.
CBG flushing out: 0 or 1 bit.
DMRS sequence initialization: 0 or 1 bit.

Format 1_0 is a compact DCI format used for downlink grant (scheduling the PDSCH). A field included in the DCI format is less than that in format 1_1, and format 1_0 only has a most necessary DCI field for scheduling the PDSCH. The DCI format specifically includes the following fields:

DCI format indication information: 1 bit, used to indicate downlink DCI or uplink DCI.
Frequency domain resource location indication: $N_{RBG}$ bits.
Time domain resource location indication information: 0, 1, 2, 3, or 4 bits.
Mapping from a virtual resource block (VRB) to a physical resource block (PRB): 0 or 1 bit.
For a transport block (TB) 1:
    Modulation and coding scheme MCS: 5 bits.
    New data indicator NDI: 1 bit.
    Redundancy version RV: 2 bits.
Number of HARQ processes.
Transmission configuration indication DAI: 0, 2, or 4 bits.
Transmission power control command (TPC command) of a scheduled PUCCH: 2 bits.
PUCCH resource indication: 3 bits.

PDSCH-to-HARQ feedback time sequence indicator: 0, 1, 2, or 3 bits.

It can be learned that format 1_1 includes modulation and coding scheme MCS fields, new data indicator NDI fields, and redundancy version RV fields that are of two transport blocks. Each transport block corresponds to one codeword, and one group that is of an MCS field, an NDI field, and an RV field and that corresponds to each transport block is a codeword information field. In this embodiment of this application, both the first DCI and the second DCI may use format 1_1.

In a possible implementation, both the first DCI and the second DCI include two codeword information fields. This may be understood as that, when DCI that meets the foregoing format schedules data transmission at a moment, the DCI may be used to indicate to schedule one codeword or two codewords, and regardless of whether the DCI is used to schedule one codeword or schedule two codewords, the DCI includes modulation and coding scheme MCS fields, new data indicator NDI fields, and redundancy version RV fields of two transport blocks. When the DCI is used to schedule two codewords, MCSs, NDIs, and RV fields that correspond to the two codewords indicate that both the two codewords are enabled. When the DCI schedules one codeword, an MCS field, an NDI field, and an RV field that correspond to one of the codewords indicate that the codeword is enabled, and an MCS field, an NDI field, and an RV field that correspond to the other codeword indicate that the codeword is disabled.

In step S401, the first network device may generate the first DCI, and indicate, by using the first DCI, whether the second DCI exists in the first time unit.

If the second DCI exists in the first time unit, it indicates that the network device in the coordinating cluster sends two pieces of DCI to the terminal device, and each piece of DCI is used to schedule one codeword. In a possible implementation, both the first DCI and the second DCI may be sent by the first network device, and this corresponds to an application scenario of single-base-station transmission. In another possible implementation, the first DCI and the second DCI may be respectively sent by the first network device and a second network device, and this corresponds to an application scenario in which the network device in the coordinating cluster transmits data for the terminal device in a COMP transmission mode. For ease of description, an example in which both the first DCI and the second DCI are sent by the first network device is used for description in subsequent embodiments of this application. However, it should be understood that this embodiment of this application is not limited thereto.

In this embodiment of this application, the first time unit may be one or more slots, subframes, or OFDM symbols. The first time unit should be understood as that, detection periodicities are configured for both the first DCI and the second DCI, and a detection moment in each detection periodicity may be used as the first time unit. The detection periodicities may be independently configured in search spaces of the first DCI and the second DCI. Alternatively, it may be pre-agreed that the detection periodicities are configured to a same value.

It should be noted that, a search sequence of blindly detecting search spaces by the UE is unknown to the network device, for example, when the network device sends two pieces of DCI, the two pieces of DCI may be separately configured in different search spaces, and the UE may first detect a search space with a smaller index number corresponding to the search space, or may first detect a search space with a larger index number corresponding to the search space. Alternatively, when two pieces of DCI are separately configured in search spaces that are partly the same, each search space corresponds to a plurality of PDCCH candidates, and the plurality of PDCCH candidates respectively belong to the two pieces of DCI, a sequence of detecting the plurality of PDCCH candidates in the search space by the UE is also unknown to the network device. In this embodiment of this application, if no additional DCI configuration and detection limitation are imposed, the network device cannot determine which DCI in the two pieces of DCI in the first time unit is first detected by the UE. The UE may first detect the first DCI, or may first detect the second DCI. Therefore, the second DCI also needs to indicate that the first DCI exists in the first time unit. In other words, when the network device in the coordinating cluster sends two pieces of DCI to the terminal device, each piece of DCI indicates that the other DCI exists, to prompt that the terminal device needs to detect the two pieces of DCI.

If the second DCI does not exist in the first time unit, it indicates that the first network device in the coordinating cluster sends only the first DCI to the terminal device. When the first DCI schedules one codeword, this corresponds to a single-base-station transmission scenario. When the first DCI schedules two codewords, data of the two codewords may be sent by the first network device, and this corresponds to the single-base-station transmission application scenario; or data of different codewords may be cooperatively transmitted by the first network device and the second network device, and each network device is used to transmit data of one codeword. For example, the first network device sends a first codeword scheduled by the first DCI, and the second network device sends a second codeword scheduled by the second DCI, that is, the CoMP transmission mode.

It should be noted that the CoMP transmission mode in this embodiment of this application specifically includes the following transmission manners:

1. Dynamic transmission point switching (DPS): For a change of a channel condition when a terminal device transmits data, a network device with a relatively good channel condition in the coordinating cluster is dynamically selected for scheduling data of the terminal device each time data is transmitted. This may be understood as that a plurality of base stations transmit data for UE in a time division manner.

2. Coherent joint transmission (C-JT): A plurality of network devices simultaneously transmit data for a terminal device, and joint precoding is performed on antenna ports of the plurality of network devices, to be specific, an optimal precoding matrix is selected to perform joint phase and amplitude weighting among the antenna ports of the plurality of network devices. In this mechanism, phase calibration needs to be performed on antennas of the plurality of network devices, so that accurate phase weighting is performed among a plurality of groups of antennas.

3. Non-coherent joint transmission (NC-JT): A plurality of network devices simultaneously transmit data for a terminal device, and independent precoding is separately performed on antenna ports of the plurality of network devices, to be specific, each network device independently selects an optimal precoding matrix to perform joint phase weighting and amplitude weighting between antenna ports of the network device. In this mechanism, phase calibration does not need to be performed on antennas of the plurality of network devices.

4. Spatial-multiplexing-based transmission: In the foregoing three transmission modes, it is assumed that two network devices transmit different data bits, that is, multi-stream transmission is supported to improve a transmission rate and a system capacity. How-ever, an objective of a spatial-multiplexing-based transmission mode is to enhance robustness of data transmission. Therefore, in the transmission mode, two network devices send a same data bit in different transmission manners (for example, precoding, power, and a beam). After receiving two same data streams, the terminal device may perform a soft-bit combination operation on the two data streams, to improve data demodulation performance.

In this embodiment of this application, information of "whether the other DCI exists in the first time unit" indicated by either of the first DCI and the second DCI may have a plurality of possible implementations. The following separately describes several possible implementations in detail.

Implementation 1:

For example, the first DCI indicates "whether the second DCI exists in the first time unit". In Implementation 1, whether the second DCI exists may be indicated by adding a new field to the first DCI. The newly added field (not shown in format 1_1 and format 1_0) may be 1 bit. For example, when a value of the newly added field in the first DCI is 1, it indicates that the second DCI exists. When a value of the newly added field in the first DCI is 0, it indicates that the second DCI does not exist.

In this way, if the second DCI does not exist, in step S402, the first network device may send the first DCI to the terminal device in the first time unit. If the second DCI exists, in step S402, the first network device may send the first DCI and the second DCI to the terminal device in the first time unit. Then, in step S403, the terminal device may detect the DCI on a time-frequency resource occupied by the PDCCH. If the first DCI is the first piece of DCI detected by the terminal device, the terminal device may determine, based on a value of the newly added field in the first DCI, whether to continue to detect the second DCI. If the value of the newly added field indicates that the second DCI exists, the detection continues; otherwise, the detection stops. If the first DCI is the second piece of DCI detected by the terminal device, the terminal device may determine, based on the first piece of DCI (namely, the second DCI) detected previously, that the indication carried in the first DCI is that "the second DCI exists in the first time unit".

In this embodiment of this application, the second DCI may use a same indication manner as the first DCI. To be specific, the second DCI also includes the foregoing newly added field, to indicate that "the first DCI exists in the first time unit". Details are not described herein again.

Implementation 2:

In Implementation 2, an existing field in the DCI format may be reused to carry information that is of "whether the second DCI exists in the first time unit" and that is indicated by either of the two pieces of DCI, so as to avoid extra signaling overheads caused by adding a new field to the current DCI.

For the first DCI, the first DCI may include at least two codeword information fields, and a first codeword information field in the at least two codeword information fields is used to indicate whether a corresponding codeword is enabled. When all of codewords corresponding to the at least two codeword information fields are enabled, the first DCI may be used to indicate that the second DCI does not exist in the first time remit. When a part of codewords corresponding to the at least two first codeword information fields are enabled, the first DCI may be used to indicate that the second DCI exists in the first time unit. In this case, the second DCI is also used to indicate that the first DCI exists in the first time unit. In this case, the second DCI also includes at least two codeword information fields, and a part of codewords corresponding to the at least two codeword information fields are enabled.

In a specific example, the first DCI may include two codeword information fields: a codeword information field 1 used to indicate a transport block TB 1 and a codeword information field 2 used to indicate a transport block TB 2. The codeword information field 1 may include an MCS field, an NDI field, and an RV field, which are respectively used to indicate a modulation and coding scheme used by a codeword corresponding to the codeword information field 1, whether data is newly transmitted or retransmitted, and a coding manner of the retransmitted data. The same applies to the codeword information field 2, Details are not described herein again.

When both the codeword corresponding to the codeword information field 1 and a codeword corresponding to the codeword information field 2 are enabled, the first DCI may be used to indicate that the second DCI does not exist in the first time unit. In this way, in step S402, the first network device may send the first DCI to the terminal device. In step S403, the terminal device may detect the DCI on the time-frequency resource occupied by the PDCCH, and determine, based on the detected first DCI, that the network device in the coordinating cluster sends only one piece of DCI, to stop a blind detection process on the second DCI. This reduces detection power consumption. In this case, if both DMRSs corresponding to the codewords corresponding to the codeword information field 1 and the codeword information field 2 use a same CL assumption, a corresponding transmission mode is transmission in which a single base station transmits a PDSCH having more than four layers (corresponding to two codewords).

When the codeword corresponding to the codeword information field 1 is enabled, and the codeword corresponding to the codeword information field 2 is disabled, or when the codeword corresponding to the codeword information field 1 is disabled, and the codeword corresponding to the codeword information field 2 is enabled, one understanding may be: The first DCI may be used to indicate that the second DCI exists in the first time unit, and another understanding may be: The first DCI does not explicitly indicate whether the second DCI exists in the first time unit. In this case, in step S403, after detecting the first DCI, the terminal device may continue to detect the second DCI by default. If the second DCI is subsequently detected, it is determined that the current transmission mode is NC-JT transmission using two codewords. Otherwise, if no second DCI is detected after a maximum quantity of times of blind detection (a maximum quantity of times that is of blind detection performed by the UE and that is specified in the current protocol is 44) is completed, it is determined that the network device in the coordinating cluster sends only one piece of DCI. In this case, a corresponding transmission mode is transmission in which a single base station transmits a PDSCH having no more than four layers (corresponding to one codeword).

Similarly, for the second DCI (if the second DCI exists), the second DCI may include at least two codeword information fields, and each of the at least two codeword information fields is used to indicate whether a corresponding codeword is enabled. When all of codewords corresponding to the at least two codeword information fields are enabled, the second DCI may be used to indicate that the first DCI does not exist in the first time unit. When a part of codewords corresponding to the at least two codeword information fields are enabled, the second DCI may be used to indicate that the first DCI exists in the first time unit.

In a specific example, the second DCI may include two codeword information fields: a codeword information field 3 used to indicate a transport block TB 1 and a codeword information field 4 used to indicate a transport block TB 2. The codeword information field 3 may include an MCS field, an NDI field, and an RV field, which are respectively used to indicate a modulation and coding scheme used by a codeword corresponding to the codeword information field 3, whether data is newly transmitted or retransmitted, and a coding manner of the retransmitted data. The same applies to the codeword information field 4. Details are not described herein again.

When both the codeword corresponding to the codeword information field 3 and a codeword corresponding to the codeword information field 4 are enabled, the second DCI may be used to indicate that the first DCI does not exist in the first time unit. When the codeword corresponding to the codeword information field 3 is enabled, and the codeword corresponding to the codeword information field 4 is disabled, the second DCI may be used to indicate that the first DCI exists in the first time unit, Certainly, because the network device sends at least one piece of DCI when scheduling downlink data to the terminal device, and this embodiment of this application is described from a perspective of assuming that the first DCI definitely exists, and the first network device sends the first DCI in the first time unit, a case in which "the second DCI indicates that the first DCI does not exist in the first time unit" does not exist. However, it should be understood that the description of which "the second DCI indicates that the first DCI does not exist in the first time unit" is used as an example to describe an indication manner in which the second DCI indicates "whether the first DCI exists". In other words, when only a part of codewords in the first DCI are enabled, the second DCI also indicates that only the part of codewords are enabled; or when all of codewords in the first DCI are enabled, the second DCI also indicates that all of codewords are enabled, so that the first DCI and the second DCI mutually indicate that the other DCI exists, and regardless of which piece of DCI is first detected by the UE, the other DCI continues to be detected. When the UE detects two pieces of DCI, both the two pieces of DCI indicate that only a part of codewords are enabled. If another case occurs, for example, if DC that is detected later indicates that all of codewords are enabled, the UE may consider that an error occurs in detection of the DCI, and may stop demodulating and decoding data indicated by the two pieces of DCI.

In this way, in step S402, the first network device may send the first DCI and the second DCI to the terminal device. In step S403, the terminal device may detect the DCI on the time-frequency resource occupied by the PDCCH. If the first DCI is the first piece of DCI detected by the terminal device, the terminal device may determine, based on the detected first DCI, that the network device in the coordinating cluster sends two pieces of DCI, and further continue to detect the second DCI. After the second DCI is subsequently detected, it may be determined that a current transmission manner is NC-IT transmission.

It should be noted that, in this embodiment of this application, the terminal device may determine, based on values of an MCS field and an RV field of a codeword information field, whether a codeword corresponding to the codeword information field is enabled. When the values of the MCS field and the RV field are some specific values, for example, when the value of the MCS field is 26 and the value of the RV field is 1, it indicates that the codeword corresponding to the codeword information field is disabled. However, when the values of the MCS field and the RV field are other values, it indicates that the codeword corresponding to the codeword information field is enabled, and data corresponding to the codeword is demodulated in a modulation and coding manner indicated by the MCS and RV fields.

Figures 5, 6A, 6B:
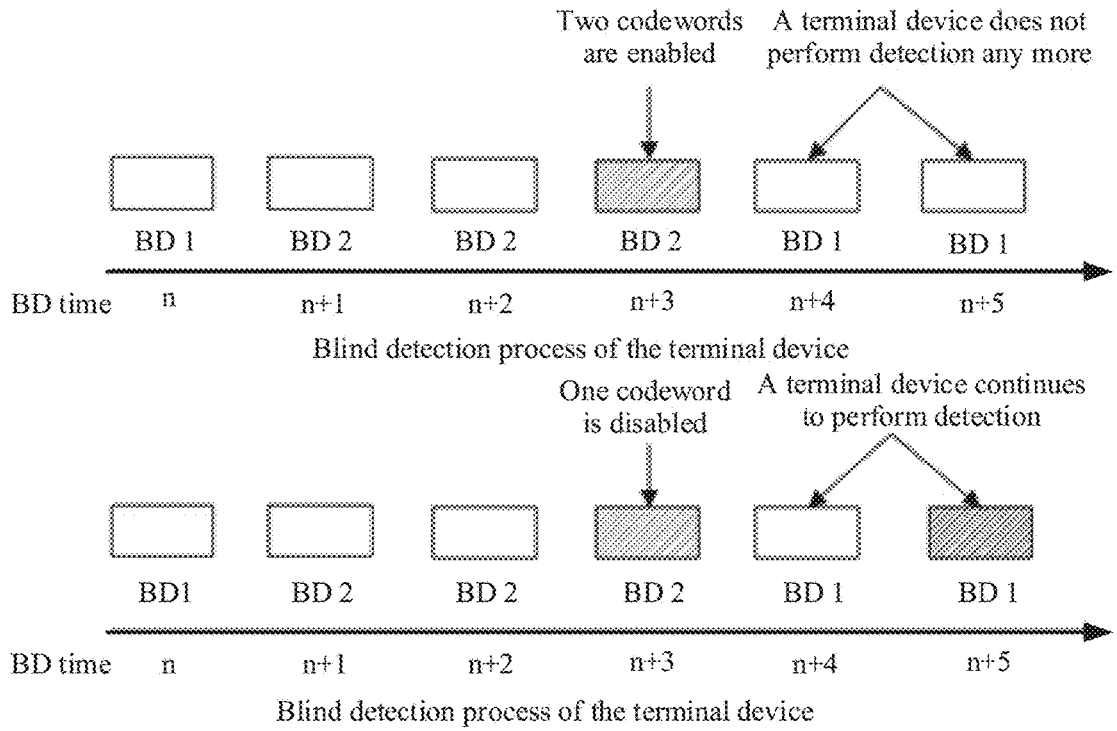
FIG. 5 is a schematic detection flowchart of a terminal device applicable to Implementation 2 according to an embodiment of this application.
FIG. 6A and FIG. 6B are schematic diagrams of a mask of a first CRC and a mask of a second CRC according to an embodiment of this application.

A detection procedure of the terminal device may be shown in FIG. 5. An $n^{th}$ blind detection (BD) time in FIG. 5 indicates detection of an $n^{th}$ PDCCH candidate that is in N PDCCH candidates (a corresponding maximum quantity of times of blind detection is N) included in all search spaces configured for the terminal device. In this embodiment of this application, one search space includes a plurality of aggregation levels, and each aggregation level may correspond to a plurality of PDCCH candidates. Assuming that the terminal device usually performs serial detection, each time blind detection is performed, only one PDCCH candidate can be detected, BD 1 corresponds to a PDCCH candidate of DCI 1, and BD 2 corresponds to a PDCCH candidate of DCI 2. When the terminal device performs an $(n+3)^{th}$ time of detection on the PDCCH candidate, the DCI 2 is successfully detected, and it is determined that both two codewords are enabled. In this case, the terminal device does not need to detect the subsequent PDCCH candidate (BD 1) corresponding to the DCI 1. When the terminal device performs an $(n+3)^{th}$ time of detection on the PDCCH candidate, the DCI 2 is successfully detected, and it is determined that one codeword is enabled. In this case, the terminal device continues to detect the subsequent PDCCH candidate (that is, the BD 1) corresponding to the DCI 1.

Implementation 3:

In Implementation 3, the MCS field, the NDI field, and the RV field in the codeword information field, and a DMRS port indication field in the DCI may be reused, to jointly indicate, in either of the two pieces of DCI, "whether the other DCI exists in the first time unit", so as to also avoid extra signaling overheads caused by adding a new field to the current DCI, and ensure that when the DMRS port indication field is reused, flexibility of the DMRS port indication field is not affected regardless of whether one codeword is scheduled or two codewords are scheduled. In the conventional technology, a quantity of DMRS ports and port numbers that are indicated by the DMRS port indication field in the DCI are determined based on a quantity of enabled codewords that is indicated by the codeword information field in the DCI. When the quantity of enabled codewords that is indicated by the DCI is greater than a predefined value, for example, is 2 (it is assumed that a maximum quantity of enabled codewords is 2), the quantity of DMRS ports that is indicated by the DMRS port indication field is greater than 4. When the quantity of enabled codewords that is indicated by the DCI is less than or equal to a predefined value, for example, is 1 (it is assumed that a maximum quantity of enabled codewords is 2), the quantity of DMRS ports that is indicated by the DMRS port indication field is less than or equal to 4.

Specifically, for the first DCI, the first DCI may include one DMRS port indication field and at least two codeword information fields. Each of the at least two codeword information fields is used to indicate whether a corresponding codeword is enabled, and the DMRS port indication field is used to indicate a demodulation reference signal DMRS port corresponding to data transmitted on the first downlink resource.

When all of codewords corresponding to the at least two codeword information fields are enabled, and a status value of the DMRS port indication field is within a first preset range, the first DCI may be used to indicate that the second DCI exists in the first time unit; or when all of codewords corresponding to the at least two codeword information fields are enabled, and a status value of the DMRS port indication field is within a second preset range, the first DCI may be used to indicate that the second DCI does not exist in the first time unit; or when a part of codewords corresponding to the at least two first codeword information fields are enabled, the first DCI may be used to indicate that the second DCI does not exist in the first time unit.

In a possible design, a quantity of DMRS ports corresponding to the status value that is of the DMRS port indication field and that is within the first preset range is less than or equal to a first threshold, and a quantity of DMRS ports corresponding to the status value that is of the DMRS port indication field and that is within the second preset range is greater than the first threshold. A specific value of the first threshold may be specifically set by a person skilled in the art according to an actual requirement, and is not specifically limited herein. Usually, when a quantity of transmission layers is greater than 4, using one codeword for data transmission causes a performance loss. Therefore, a possible setting method is to set the first threshold to 4.

In a specific example, the first DCI may include a first DMRS port indication field and two codeword information fields. The two codeword information fields are respectively a codeword information field 1 used to indicate a transport block TB 1 and a codeword information field 2 used to indicate a transport block TB 2. The codeword information field 1 may include an MCS field, an NDI field, and an RV field, which are respectively used to indicate a modulation and coding scheme used by a codeword corresponding to the codeword information field 1, whether data is newly transmitted or retransmitted, and a coding manner of the retransmitted data. The same applies to the codeword information field 2. Details are not described herein again. The first DMRS port indication field is used to indicate a DMRS port number corresponding to data transmitted on the first downlink resource this time and a quantity of DMRS ports. The quantity of ports represents a quantity of transport layers corresponding to the data transmitted this time.

If both the codeword corresponding to the codeword information field 1 and a codeword corresponding to the codeword information field 2 are enabled, and a value of the first DMRS port indication field is within a first preset range, the first DCI may be used to indicate that the second DCI exists in the first time unit. In this way, in step S402, the first network device may send the first DCI and the second DCI to the terminal device. In step S403, the terminal device may detect the DCI on the time-frequency resource occupied by the PDCCH. If the first DCI is the first piece of DCI detected by the terminal device, the terminal device may determine, based on the detected first DCI, that the network device in the coordinating cluster sends two pieces of DCI, and further need to continue to detect the second DCI subsequently. In this case, a corresponding transmission mode is NC-JT transmission using two codewords. Similarly, if the second DCI is the first piece of DCI detected by the terminal device, the terminal device may determine that the first DCI further needs to be continuously detected subsequently. In this case, a corresponding transmission mode is NC-JT transmission using two codewords.

On the contrary, if both the codeword corresponding to the codeword information field 1 and the codeword corresponding to the codeword information field 2 are enabled, and the value of the first DMRS port indication field is within a second preset range (the second preset range and the first preset range are different, and do not overlap), the first DCI may be used to indicate that the second DCI does not exist in the first time unit. In this way, in step S402, the first network device may send the first DCI to the terminal device. In step S403, the terminal device max detect the DCI on the time-frequency resource occupied by the PDCCH, and determine, based on the detected first DCI, that the network device in the coordinating cluster sends only one piece of DCI, thereby stopping an unnecessary blind detection process, and reducing detection power consumption. In this case, corresponding transmission is transmission in which a single base station transmits a PDSCH having more than four layers (corresponding to two codewords).

Further, if only one of the codeword corresponding to the codeword information field 1 and the codeword corresponding to the codeword information field 2 is enabled, regardless of whether the value of the first DMRS port indication field is within the first preset range or the second preset range, the first DCI may be used to indicate that the second DCI does not exist in the first time unit. In this way, in step S402, the first network device may send the first DCI to the terminal device. In step S403, the terminal device may detect the DCI on the time-frequency resource occupied by the PDCCH, and determine, based on the detected first DCI, that the network device in the coordinating cluster sends only one piece of DCI, thereby stopping an unnecessary blind detection process, and reducing detection power consumption. In this case, corresponding transmission is transmission in which a single base station transmits a PDSCH having no more than tour layers (corresponding to one codeword).

Similarly, for the second DCI, the second DCI may include one DMRS port indication field and at least two codeword information fields. Each of the at least two codeword information fields is used to indicate whether a corresponding codeword is enabled, and a second DMRS port indication field may be used to indicate a DMRS port corresponding to data transmitted on the second downlink resource.

When all of codewords corresponding to the at least two codeword information fields are enabled, and a status value of the DMRS port indication field is within a first preset range, the second DCI may be used to indicate that the first DCI exists in the first time unit; or when all of codewords corresponding to the at least two codeword information fields are enabled, and a status value of the DMRS port indication field is within a second preset range, the second DCI may be used to indicate that the first DCI does not exist in the first time unit; or when a part of codewords corresponding to the at least two codeword information fields are enabled, the second DCI may be used to indicate that the first DCI does not exist in the first time unit.

In a possible design, a quantity of DMRS ports corresponding to the status value that is of the DMRS port indication field and that is within the first preset range is less than or equal to a first threshold, and a quantity of DMRS ports corresponding to the status value that is of the DMRS port indication field and that is within the second preset range is greater than the first threshold.

In a specific example, the second DCI may include two codeword information fields and a second DMRS port indication field. The two codeword information fields are respectively a codeword information field 3 used to indicate a transport block TB 1 and a codeword information field 4 used to indicate a transport block TB 2. The codeword information field 3 may include an MCS field, an NDI field, and an RV field, which are respectively used to indicate a modulation and coding scheme used by a codeword corresponding to the codeword information field 3, whether data is newly transmitted or retransmitted, and a coding manner of the retransmitted data. The same applies to the codeword information field 4. Details are not described herein again. The second DMRS port indication field is used to indicate a DMRS port number corresponding to data, transmitted on the second downlink resource this time and a quantity of DMRS ports. The quantity of ports represents a quantity of transport layers corresponding to the data transmitted this time.

If both the codeword corresponding to the codeword information field 3 and a codeword corresponding to the codeword information field 4 are enabled, and a value of the second DMRS port indication field is within a first preset range, the second DCI may be used to indicate that the first DCI exists in the first time unit. In this way, in step S402, the first network device may send the first DCI and the second DCI to the terminal device. In step S403, the terminal device may detect the DCI on the time-frequency resource occupied by the PDCCH. If the second DCI is the first piece of DCI detected by the terminal device, the terminal device may determine, based on the detected second DCI, that the network device in the coordinating cluster sends two pieces of DCI, and further needs to continue to detect the first DCI subsequently. In this case, corresponding transmission is NC-JT transmission. Similarly, if the first DCI is the first piece of DCI detected by the terminal device, the terminal device may determine that the second DCI further needs to be continuously detected subsequently. In this case, corresponding transmission is NC-JT-transmission.

On the contrary, if both the codeword corresponding to the codeword information field 3 and the codeword corresponding to the codeword information field 4 are enabled, and the value of the second DMRS port indication field is within a second preset range the second preset range and the first preset range are different, and do not overlap), the second DCI may be used to indicate that the first DCI does not exist in the first time unit. In this way, in step S402, the first network device may send the second DCI to the terminal device. In step S403, the terminal device may detect the DCI on the time-frequency resource occupied by the PDCCH, and determine, based on the detected second DCI, that the network device in the coordinating cluster sends only one piece of DCI (that is, the second DCI), thereby stopping an unnecessary blind detection process, and reducing detection power consumption. In this case, corresponding transmission is transmission in which a single base station transmits a PDSCH having more than four layers (corresponding to two codewords).

Further, if only one of the codeword corresponding to the codeword information field 3 and the codeword corresponding to the codeword information field 4 is enabled, regardless of whether the value of the second. DMRS port indication field is within the first preset range or the second preset range, the second DCI may be used to indicate that the first DCI does not exist in the first time unit. In this way, in step S402, the first network device may send the second DCI to the terminal device. In step S403, the terminal device may detect the DCI on the time-frequency resource occupied by the PDCCH, and determine, based on the detected second DCI, that the network device in the coordinating cluster sends only one piece of DCI (that is, the second DCI), thereby stopping an unnecessary blind detection process, and reducing detection power consumption. In this case, a corresponding transmission mode is transmission in which a single base station transmits a PDSCH having no more than four layers (corresponding to one codeword).

It should be understood that in a scenario in which the network device schedules downlink data transmission for the terminal device, the network device delivers at least one piece of DCI. If one piece of DCI is delivered, and one codeword is scheduled by the DCI, it indicates that scheduled downlink data transmission is single-base-station transmission. If two pieces of DCI are delivered, or one piece of DCI is delivered but two codewords are scheduled by the DCI, it indicates that scheduled downlink data transmission may be multi-base-station coordinated transmission. Therefore, this embodiment of this application is described from a perspective that the first DCI definitely exists, and the second. DCI may exist or may not exist. Therefore, in this embodiment of this application, a case in which "the second DCI indicates that the first DCI does not exist in the first time unit" does not exist. However, the foregoing description is merely intended to describe the indication manner of the second DCI. In addition, the second DCI may perform an indication in a manner that is the same as or similar to that of the first DCI.

It should be noted that, in Implementation 3, whether a codeword corresponding to a codeword information field is enabled is similar to the description in Implementation 2; to be specific, when values of an MCS field and an RV field in the codeword information field are some specific values, it indicates that the codeword corresponding to the codeword information field is disabled; otherwise, the codeword is enabled. Details are not described herein again.

Table 1 shows an example of a meaning of the DMRS port indication field in this embodiment of this application. Referring to the following Table 1, the first DCI is used as an example. When only one of the codeword corresponding to the codeword information field 1 and the codeword corresponding to the codeword information field 2 is enabled, the meaning of the DMRS port indication field may be interpreted based on a left half part of Table 1. In this case, a DMRS port indicated by the DMRS port indication field corresponds to a DMRS port corresponding to one codeword indicated, by the first DCI, to be enabled. When two codewords are enabled, the meaning of the DMRS port indication field may be interpreted based on the right half part of Table 1. When a status value indicated by the DMRS port indication field is within a first preset range, the DMRS port indicated by the DMRS port indication field corresponds to a DMRS port corresponding to two codewords indicated, by the first DCI, to be enabled. When a status value indicated by the DMRS port indication field is within a second preset range, the DMRS port indicated by the DMRS port indication field corresponds to a DMRS port corresponding to one of two codewords indicated, by the first DCI, to be enabled. How-ever, a DMRS port corresponding to the other codeword is indicated by the second indication information, that is, the second DCI. In this case, the second DCI also indicates to enable two codewords, the status value indicated by the DMRS port indication field is within the second preset range, and the DMRS port indicated by the DMRS port indication field corresponds to the DMRS port corresponding to one of the two codewords indicated, by the second DCI, to be enabled.

For example, when a value of the DMRS port indication field is 0, if only one codeword is enabled this time, it indicates that a DMRS occupies a port 0 (to be specific, the codeword is transmitted through the port 0, and a total quantity of current transport layers is 1). If both two codewords are enabled this time, it indicates that a DMRS occupies ports 0 to 4 (to be specific, the codeword is transmitted through the ports 0 to 4, a total quantity of current transport layers is 5, a codeword 0 corresponds to two-layer transmission, and a codeword 1 corresponds to three-layer transmission). It should be noted that in this embodiment of this application, a mapping relationship between a codeword and a quantity of transport layers may be predefined in a protocol. Herein, the meaning of the DMRS port indication field is described only by using a possible example, but the mapping relationship between a codeword and a quantity of transport layers is not limited thereto.

Referring to Table 1, in Implementation 3, the first preset range in which the value of the DMRS port indication field is located specifically means that a value range (that is, a bit field value in Table 1) of the DMRS port indication field is [4, 31], which is a closed interval and includes 4 and 31. Correspondingly, the second preset range specifically means that a value range of the DMRS port indication field is [0, 3], which is a closed interval and includes 0 and 3. It should be noted that, specific DMRS port information corresponding to the status values 0 to 31 of the field may be determined in a predefined manner and does not necessarily follow a sequence in the example table. In other words, the DMRS port information needs to include a DMRS port combination in the example table, and a correspondence between a DMRS port combination and a bit field value may be any predefined manner.

TABLE 1

DMRS port indication table of a maximum of eight DMRS ports

| | One codeword (the codeword 0 is enabled, and the codeword 1 is disabled) | | | Two codewords are enabled (the codeword 0 is enabled, and the codeword 1 is enabled). | | | |
|---|---|---|---|---|---|---|---|
| Bit field value | CDM group that does not carry data | DMRS port | Length of an occupied OFDM symbol | Bit field value | CDM group that does not carry data | DMRS port | DMRS symbol length |
| 0 | 1 | 0 | 1 | 0 | 2 | 0 to 4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4 | 2 | 1 | 1 |
| 5 | 2 | 2 | 1 | 5 | 2 | 2 | 1 |
| 6 | 2 | 3 | 1 | 6 | 2 | 3 | 1 |
| 7 | 2 | 0, 1 | 1 | 7 | 2 | 0, 1 | 1 |
| 8 | 2 | 2, 3 | 1 | 8 | 2 | 2, 3 | 1 |
| 9 | 2 | 0 to 2 | 1 | 9 | 2 | 0 to 2 | 1 |
| 10 | 2 | 0 to 3 | 1 | 10 | 2 | 0 to 3 | 1 |
| 11 | 2 | 0, 2 | 1 | 11 | 2 | 0, 2 | 1 |
| 12 | 2 | 0 | 2 | 12 | 2 | 0 | 2 |
| 13 | 2 | 1 | 2 | 13 | 2 | 1 | 2 |
| 14 | 2 | 2 | 2 | 14 | 2 | 2 | 2 |
| 15 | 2 | 3 | 2 | 15 | 2 | 3 | 2 |
| 16 | 2 | 4 | 2 | 16 | 2 | 4 | 2 |
| 17 | 2 | 5 | 2 | 17 | 2 | 5 | 2 |
| 18 | 2 | 6 | 2 | 18 | 2 | 6 | 2 |
| 19 | 2 | 7 | 2 | 19 | 2 | 7 | 2 |
| 20 | 2 | 0, 1 | 2 | 20 | 2 | 0, 1 | 2 |
| 21 | 2 | 2, 3 | 2 | 21 | 2 | 2, 3 | 2 |
| 22 | 2 | 4, 5 | 2 | 22 | 2 | 4, 5 | 2 |
| 23 | 2 | 6, 7 | 2 | 23 | 2 | 6, 7 | 2 |
| 24 | 2 | 0, 4 | 2 | 24 | 2 | 0, 4 | 2 |
| 25 | 2 | 2, 6 | 2 | 25 | 1 | 0 | 1 |
| 26 | 2 | 0, 1, 4 | 2 | 26 | 2 | 0, 1, 4 | 2 |
| 27 | 2 | 2, 3, 6 | 2 | 27 | 2 | 2, 3, 6 | 2 |
| 28 | 2 | 0, 1, 4, 5 | 2 | 28 | 2 | 0, 1, 4, 5 | 2 |
| 29 | 2 | 2, 3, 6, 7 | 2 | 29 | 2 | 2, 3, 6, 7 | 2 |
| 30 | 2 | 0, 2, 4, 6 | 2 | 30 | 1 | 1 | 1 |
| 31 | Reserved | Reserved | Reserved | 31 | 1 | 0, 1 | 1 |

The foregoing Table 1 corresponds to a DMRS configuration method. To be specific, a maximum quantity of DMRS ports that support a DCI indication is 8, that is, a maximum quantity of transport layers for data transmission is 8. Table 2 to Table 4 respectively correspond to other DMRS configuration methods.

For example, in Table 2 (2), a corresponding maximum quantity of FAIRS ports that support a DCI indication is 4, that is, a maximum quantity of transport layers for data transmission is 4. In this case, both the first DCI and the second DCI may include only an MCS indication field, an RV indication field, and an NDI indication field that correspond to one codeword. When the quantity of DMRS ports is greater than 2, it indicates that the other DCI does not exist. For example, the field value is 9 or 10. In addition, DMRS ports indicated by DMRS port indication fields that are in one piece of DCI are located in a same CDM group. In this embodiment, when the field value is 0, 1, 2, 5, 6, or 8, a DMRS port indicated by the field value is a DMRS port corresponding to a codeword enabled by the DCI, a DMRS port corresponding to the other codeword is determined based on the other DCI, and a value of a DMRS port indication field in the other DCI is also 0, 1, 2, 5, 6, or 8. When the field value is 3, 4, 7, or 9 to 13, the DMRS port indicated by the field value is a DMRS port corresponding to one codeword enabled by the DCI, and the other DCI does not exist.

For another example, in Table 3, a corresponding maximum quantity of DMRS ports that support the DCI indication is 6, that is, a maximum quantity of transport layers for data transmission is 6. A principle of indicating whether the other DCI exists is similar to the indication manner corresponding to Table 1. The status values 0 and 1 in the right half part of the DMRS table indicate that the other DCII does not exist, and the status values 2 to 25 indicate that the other DCI exists. The first DCI is used as an example. When only one of the codeword corresponding to the codeword information field 1 and the codeword corresponding to the codeword information field 2 is enabled, the meaning of the DMRS port indication field may be interpreted based on a left half part of Table 3. In this case, the DMRS port indicated by the DMRS port indication field corresponds to a DMRS port corresponding to one codeword indicated, by the first DCI, to be enabled. When two codewords are enabled, the meaning of the DMRS port indication field may be interpreted based on the right half part of Table 3. When the status value indicated by the DMRS port indication field is within the first preset range, the DMRS port indicated by the DMRS port indication field corresponds to a DMRS port corresponding, to two codewords indicated, by the first DCI, to be enabled. When the status value indicated by the DMRS port indication field is within the second preset range, the DMRS port indicated by the DMRS port indication field corresponds to a DMRS port corresponding to one of two codewords indicated, by the first DCI, to be enabled. However, a DMRS port corresponding to the other codeword is indicated by the second indication information, that is, the second DCI. In this case, the second DCI also indicates to enable two codewords, the status value indicated by the DMRS port indication field is within the second preset range, and the DMRS port indicated by the DMRS port indication field corresponds to the DMRS port corresponding to one of the two codewords indicated, by the second DCI, to be enabled.

Referring to Table 3, in Implementation 3, the first preset range in which the value of the DMRS port indication field is located specifically means that a value range (that is, a bit field value in Table 2) of the DMRS port indication field is [2, 31], which is a closed interval and includes 2 and 31. Correspondingly, the second preset range specifically means that a value range of the DMRS port indication field is [0, 1], which is a closed interval and includes 0 and 1, It should be noted that, specific DMRS port information corresponding to the status values 0 to 31 of the field may be determined in a predefined manner and does not necessarily follow a sequence in the example table. In other words, the DMRS port information needs to include a DMRS port combination in the example table, and a correspondence between a DMRS port combination and a bit field value may be any predefined manner. A quantity of DMRS ports corresponding to the first preset range is greater than 4, and a quantity of DMRS ports corresponding to the second preset range is less than or equal to 4.

For another example, in Table 4, a corresponding maximum quantity of DINARS ports that support the DCI indication is 12, that is, a maximum quantity of transport layers for data transmission is 12. A principle of indicating whether the other DCI exists is similar to the indication manner corresponding to Table 1. The status values 0 to 5 in the right half part of the DMRS table indicate that the other DCI does not exist, and the status values 6 to 63 indicate that the other DCI exists. The first DCI is used as an example. When only one of the codeword corresponding to the codeword information field 1 and the codeword corresponding to the codeword information field 2 is enabled, the meaning of the DMRS port indication field may be interpreted based on a left half part of Table 4. In this case, the DMRS port indicated by the DMRS port indication field corresponds to a DMRS port corresponding to one codeword indicated, by the first DCI, to be enabled. When two codewords are enabled, the meaning of the DMRS port indication field may be interpreted based on the right half part of Table 4. When the status value indicated by the DMRS port indication field is within the first preset range, the DMRS port indicated by the DMRS port indication field corresponds to a DMRS port corresponding to two codewords indicated, by the first DCI, to be enabled. When the status value indicated by the DMRS port indication field is within the second preset range, the DMRS port indicated by the DMRS port indication field corresponds to a DMRS port corresponding to one of two codewords indicated, by the first DCI, to be enabled. However, a DMRS port corresponding to the other codeword is indicated by the second indication information, that is, the second DCI. In this case, the second DCI also indicates to enable two codewords, the status value indicated by the DMRS port indication field is within the second preset range, and the DMRS port indicated by the DMRS port indication field corresponds to the DMRS port corresponding to one of the two codewords indicated, by the second DCI, to be enabled.

Referring to Table 4, in Implementation 3, the first preset range in which the value of the DMRS port indication field is located specifically means that a value range (that is, a bit field value in Table 2) of the DMRS port indication field is [6, 63], which is a closed interval and includes 6 and 63. Correspondingly, the second preset range specifically means that a value range of the DMRS port indication field is [0, 5], which is a closed interval and includes 0 and ti. It should be noted that, specific DMRS port information corresponding to the status values 0 to 63 of the field may be determined in a predefined manner and does not necessarily follow a sequence in the example table. In other words, the DMRS port information needs to include a DMRS port combination in the example table, and a correspondence between a DMRS port combination and a bit field value may be any predefined manner. A quantity of DMRS ports corresponding to the first preset range is greater than 4, and a quantity of DMRS ports corresponding to the second preset range is less than or equal to 4.

TABLE 2

(1) Indication table of a maximum of four DMRS ports in the conventional technology

| Bit field value | CDM group that does not carry data | DMRS port |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0 to 2 |
| 10 | 2 | 0 to 3 |
| 11 | 2 | 0, 2 |
| 12 to 15 | Reserved | Reserved |

TABLE 2

(2) Indication table of a maximum of four DMRS ports in the solution of the application

| Bit field value | Whether the other DCI exists | DMRS port |
|---|---|---|
| 0 | Exist | 0 |
| 1 | Exist | 1 |
| 2 | Exist | 0, 1 |
| 3 | Do not exist | 0 |
| 4 | Do not exist | 1 |
| 5 | Exist | 2 |
| 6 | Exist | 3 |
| 7 | Do not exist | 0, 1 |
| 8 | Exist | 2, 3 |
| 9 | Do not exist | 0 to 2 |
| 10 | Do not exist | 0 to 3 |
| 11 | Do not exist | 2, 3 |
| 12 | Do not exist | 2 |
| 13 | Do not exist | 3 |
| 14 and 15 | Reserved | Reserved |

TABLE 3

DMRS port indication table of a maximum of six DMRS ports

| | One codeword is enabled (the codeword 0 is enabled, and the codeword 1 is disabled) | | | Two codewords are enabled (the codeword 0 is enabled, and the codeword 1 is enabled). | |
|---|---|---|---|---|---|
| Bit field value | CDM group that does not carry data | Bit field value | CDM group that does not carry data | Bit field value | CDM group that does not carry data |
| 0 | 1 | 0 | 0 | 3 | 0 to 4 |
| 1 | 1 | 1 | 1 | 3 | 0 to 5 |
| 2 | 1 | 0, 1 | 2 | 1 | 0, 1 |
| 3 | 2 | 0 | 3 | 2 | 0 |
| 4 | 2 | 1 | 4 | 2 | 1 |
| 5 | 2 | 2 | 5 | 2 | 2 |
| 6 | 2 | 3 | 6 | 2 | 3 |
| 7 | 2 | 0, 1 | 7 | 2 | 0, 1 |
| 8 | 2 | 2, 3 | 8 | 2 | 2, 3 |
| 9 | 2 | 0 to 2 | 9 | 2 | 0 to 2 |
| 10 | 2 | 0 to 3 | 10 | 2 | 0 to 3 |
| 11 | 3 | 0 | 11 | 3 | 0 |
| 12 | 3 | 1 | 12 | 3 | 1 |
| 13 | 3 | 2 | 13 | 3 | 2 |
| 14 | 3 | 3 | 14 | 3 | 3 |
| 15 | 3 | 4 | 15 | 3 | 4 |
| 16 | 3 | 5 | 16 | 3 | 5 |
| 17 | 3 | 0, 1 | 17 | 3 | 0, 1 |
| 18 | 3 | 2, 3 | 18 | 3 | 2, 3 |
| 19 | 3 | 4, 5 | 19 | 3 | 4, 5 |
| 20 | 3 | 0 to 2 | 20 | 3 | 0 to 2 |
| 21 | 3 | 3 to 5 | 21 | 3 | 3 to 5 |
| 22 | 3 | 0 to 3 | 22 | 3 | 0 to 3 |
| 23 | 2 | 0, 2 | 23 | 2 | 0, 2 |
| 24 to 31 | Reserved | Reserved | 24 | 1 | 0 |
| | | | 25 | 1 | 1 |
| | | | 26 to 31 | Reserved | Reserved |

TABLE 4

DMRS port indication table of a maximum of 12 DMRS ports

| | One codeword (the codeword 0 is enabled, and the codeword 1 is disabled) | | | | Two codewords are enabled (the codeword 0 is enabled, and the codeword 1 is enabled). | | |
|---|---|---|---|---|---|---|---|
| Bit field value | CDM group that does not carry data | Bit field value | CDM group that does not carry data | Bit field value | CDM group that does not carry data | Bit field value | CDM group that does not carry data |
| 0 | 1 | 0 | 1 | 0 | 3 | 0 to 4 | 1 |
| 1 | 1 | 1 | 1 | 1 | 3 | 0 to 5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6 | 2 | 3 | 1 |
| 7 | 2 | 0, 1 | 1 | 7 | 2 | 0, 1 | 1 |
| 8 | 2 | 2, 3 | 1 | 8 | 2 | 2, 3 | 1 |
| 9 | 2 | 0 to 2 | 1 | 9 | 2 | 0 to 2 | 1 |
| 10 | 2 | 0 to 3 | 1 | 10 | 2 | 0 to 3 | 1 |
| 11 | 3 | 0 | 1 | 11 | 3 | 0 | 1 |
| 12 | 3 | 1 | 1 | 12 | 3 | 1 | 1 |
| 13 | 3 | 2 | 1 | 13 | 3 | 2 | 1 |
| 14 | 3 | 3 | 1 | 14 | 3 | 3 | 1 |

TABLE 4-continued

DMRS port indication table of a maximum of 12 DMRS ports

| | One codeword (the codeword 0 is enabled, and the codeword 1 is disabled) | | | Two codewords are enabled (the codeword 0 is enabled, and the codeword 1 is enabled). | | | |
|---|---|---|---|---|---|---|---|
| Bit field value | CDM group that does not carry data | Bit field value | CDM group that does not carry data | Bit field value | CDM group that does not carry data | Bit field value | CDM group that does not carry data |
| 15 | 3 | 4 | 1 | 15 | 3 | 4 | 1 |
| 16 | 3 | 5 | 1 | 16 | 3 | 5 | 1 |
| 17 | 3 | 0, 1 | 1 | 17 | 3 | 0, 1 | 1 |
| 18 | 3 | 2, 3 | 1 | 18 | 3 | 2, 3 | 1 |
| 19 | 3 | 4, 5 | 1 | 19 | 3 | 4, 5 | 1 |
| 20 | 3 | 0 to 2 | 1 | 20 | 3 | 0 to 2 | 1 |
| 21 | 3 | 3 to 5 | 1 | 21 | 3 | 3 to 5 | 1 |
| 22 | 3 | 0 to 3 | 1 | 22 | 3 | 0 to 3 | 1 |
| 23 | 2 | 0, 2 | 1 | 23 | 2 | 0, 2 | 1 |
| 24 | 3 | 0 | 2 | 24 | 3 | 0 | 2 |
| 25 | 3 | 1 | 2 | 25 | 3 | 1 | 2 |
| 26 | 3 | 2 | 2 | 26 | 3 | 2 | 2 |
| 27 | 3 | 3 | 2 | 27 | 3 | 3 | 2 |
| 28 | 3 | 4 | 2 | 28 | 3 | 4 | 2 |
| 29 | 3 | 5 | 2 | 29 | 3 | 5 | 2 |
| 30 | 3 | 6 | 2 | 30 | 3 | 6 | 2 |
| 31 | 3 | 7 | 2 | 31 | 3 | 7 | 2 |
| 32 | 3 | 8 | 2 | 32 | 3 | 8 | 2 |
| 33 | 3 | 9 | 2 | 33 | 3 | 9 | 2 |
| 34 | 3 | 10 | 2 | 34 | 3 | 10 | 2 |
| 35 | 3 | 11 | 2 | 35 | 3 | 11 | 2 |
| 36 | 3 | 0, 1 | 2 | 36 | 3 | 0, 1 | 2 |
| 37 | 3 | 2, 3 | 2 | 37 | 3 | 2, 3 | 2 |
| 38 | 3 | 4, 5 | 2 | 38 | 3 | 4, 5 | 2 |
| 39 | 3 | 6, 7 | 2 | 39 | 3 | 6, 7 | 2 |
| 40 | 3 | 8, 9 | 2 | 40 | 3 | 8, 9 | 2 |
| 41 | 3 | 10, 11 | 2 | 41 | 3 | 10, 11 | 2 |
| 42 | 3 | 0, 1, 6 | 2 | 42 | 3 | 0, 1, 6 | 2 |
| 43 | 3 | 2, 3, 8 | 2 | 43 | 3 | 2, 3, 8 | 2 |
| 44 | 3 | 4, 5, 10 | 2 | 44 | 3 | 4, 5, 10 | 2 |
| 45 | 3 | 0, 1, 6, 7 | 2 | 45 | 3 | 0, 1, 6, 7 | 2 |
| 46 | 3 | 2, 3, 8, 9 | 2 | 46 | 3 | 2, 3, 8, 9 | 2 |
| 47 | 3 | 4, 5, 10, 11 | 2 | 47 | 3 | 4, 5, 10, 11 | 2 |
| 48 | 1 | 0 | 2 | 48 | 1 | 0 | 2 |
| 49 | 1 | 1 | 2 | 49 | 1 | 1 | 2 |
| 50 | 1 | 6 | 2 | 50 | 1 | 6 | 2 |
| 51 | 1 | 7 | 2 | 51 | 1 | 7 | 2 |
| 52 | 1 | 0, 1 | 2 | 52 | 1 | 0, 1 | 2 |
| 53 | 1 | 6, 7 | 2 | 53 | 1 | 6, 7 | 2 |
| 54 | 2 | 0, 1 | 2 | 54 | 2 | 0, 1 | 2 |
| 55 | 2 | 2, 3 | 2 | 55 | 2 | 2, 3 | 2 |
| 56 | 2 | 6, 7 | 2 | 56 | 2 | 6, 7 | 2 |
| 57 | 2 | 8, 9 | 2 | 57 | 2 | 8, 9 | 2 |
| 58 to 63 | Reserved | Reserved | Reserved | 58 | 1 | 0 | 1 |
| | | | | 59 | 1 | 1 | 1 |
| | | | | 60 | 1 | 0, 1 | 1 |
| | | | | 61 | 2 | 0 | 1 |
| | | | | 62 | 2 | 1 | 1 |
| | | | | 63 | 2 | 2 | 1 |

In this way, after the first network device sends the first DCI to the terminal device in step S402, in step S403, the terminal device may detect, on the time-frequency resource occupied by the corresponding PDCCH, the first DCI based on a search space configured for the first DCI. If the first DCI detected by the terminal device is prior to the second DCI, after detecting the first DCI, the terminal device may first determine a quantity of enabled codewords based on the codeword information field 1 and the codeword information field 2 that are in the first DCI, and then determine, based on a value of the DMRS port indication field in the first DCI, whether to continue to detect the second DCI.

Specifically, in the first DCI first detected by the terminal device, when MCS fields and RV fields in two codeword information fields indicate that codewords are enabled, and field values indicated by the first DMRS port indication field are 0 to 3, the terminal device may read the right half part of Table 1, and determine not to continue to detect the second. DCI. Current transmission is transmission in which a single base station transmits a PDSCH having more than four layers. Scheduling information of codewords corresponding to two codeword information fields is indicated by the first DCI, and a DMRS port is also indicated by the field values 0 to 3 in the right half part of the DMRS port indication table in the first DCI.

In the first DCI first detected by the terminal device, when MCS fields and RV fields of the two codeword information fields indicate that codewords are enabled, and field values indicated by the DMRS port indication field are 4 to 31, the terminal device may read the right half part of Table 1, and determine that the second DCI needs to be detected continuously. In this case, current transmission is NC-JT transmission, but the field values 4 to 31 of the DMRS port indication field in the first DCI detected by the terminal device indicate only DMRS port information of one codeword (that is, a codeword currently scheduled by the first DCI), and DMRS port information of the other codeword is indicated by a DMRS port indication field in the second DCI subsequently detected by the terminal device.

In the first DCI first detected by the terminal device, when the MCS field and the RV field of one of the two codeword information fields indicate that a corresponding codeword is disabled, the terminal device may determine that the second. DCI does not exist, and stop a blind detection process on the DCI. In this case, transmission is transmission in which a single base station transmits a PDSCH having fewer than four layers. The terminal device may read the left half part of Table 1, and determine, based on the DMRS port indication information, the DMRS port information corresponding to the enabled one codeword.

It should be noted that, when one codeword is enabled, a DMRS port indicates that 31 states exist, and when two codewords are enabled, a state in which field values are 4 to 31 is used to indicate a DMRS port of one codeword, this corresponds to 28 states in total, and three states cannot be indicated, which respectively correspond to the values 3, 25, and 30 in the left half part of Table 1. A reason why the three values do not need to be indicated is as follows: For the value 3, the terminal device may determine, based on whether the second DCI is detected, whether the PDSCH is mapped to the CDM group 1. When the second DCI is detected, the PDSCH is not mapped to the CDM group 1; or when the second DCI is not detected, the PDSCH is mapped to the CDM group 1. For values 25 and 30, it is specified in the current protocol that DMRS ports in one CDM group all have a same quasi co-location QCL assumption, DMRS ports sent by a same base station should have a same QCL assumption, and DMRS ports sent by different base stations should have different QCL assumptions. Therefore, the values 25 and 30 do not need to be indicated.

Implementation 4:

In Implementation 4, the indication of "whether the other DCI exists" may be carried by using a mask of a cyclic redundancy check (CRC) used by a control information bit of each piece of DCL Specifically, the first DCI is carried on a physical downlink control channel PDCCH for transmission. An original control data bit on the PDCCH is first attached with a CRC check bit, then scrambled by using a radio network temporary: identifier (RNTI), and then transmitted to a channel coding module for rate matching. According to a specific criterion, for example, quadrature phase shill keying (QPSK), PDCCH modulation is performed, and finally the bit is mapped to the time-frequency resource.

In this embodiment of this application, the network device may define a meaning of the mask (which may also be referred to as a CRC mask, a scrambling bit, or a scrambling sequence) of the CRC bit used in an RNTI scrambling process, to transmit different indication information to the terminal device. After detecting the DCI, the terminal device may interpret the CRC check bit based on a meaning of the scrambling sequence defined by the network device, and determine indication information of the network device, so that additional indication information that is from the network device can be transmitted to the terminal device without affecting a length of the information in the DCI, Different meanings of masks of CRC bits may enable the terminal device and the network device to reach an agreement in a predefined manner.

For example, the scrambling sequence is 16 bits, Referring to FIG. 6A and FIG. 6B, if the terminal device determines, through decoding, that a mask of a CRC bit of the detected first DCI is a first scrambling sequence (for example, <0,0,0,0,0,0,0,0,0,0,0,0,0,0,0,0>), the first DCI may be used to indicate that the second DCI exists. In this case, the network device in the coordinating cluster sends two pieces of DCI in total. If the first DCI is the first piece of DCI detected by the terminal device, the terminal device may continue to detect subsequent second DCI. If the terminal device determines, through decoding, that a mask of a CRC bit of the detected first DCI is a second scrambling sequence (for example, <1,1,1,1,1,1,1,1,1,1,1,1,1,1,1,1>), the first DCI may be used to indicate that the second DCI does not exist. In this case, the network device in the coordinating cluster sends only one piece of DCI (namely, the first DCI). Therefore, the terminal device may determine that the second. DCI does not exist subsequently, and stop an unnecessary blind detection process.

It should be understood that, that the first scrambling sequence is <0,0,0,0,0,0,0,0,0,0,0,0,0,0,0,0>, and the second scrambling sequence is 1,1,1,1,1,1,1,1,1,1,1,1,1,1,1,1> is merely a possible example. In another possible design, the first scrambling sequence may alternatively be <0,1,0,1,0, 1,0,1,0,1,0,1,0,1,0,1>, and correspondingly, the second scrambling sequence may alternatively be <1,0,1,0,1,0,1,0, 1,0,1,0,1,0,1,0>. It should be understood that, based on the example in this embodiment of this application, the first scrambling sequence and the second scrambling sequence may alternatively have other possible variations or implementations, provided that indication information corresponding to different scrambling sequences is agreed upon by the terminal device and the network device in advance. Examples are not listed one by one herein in this embodiment of this application.

Implementation 5:

In Implementation 5, the indication of "whether the other DCI exists in the first time unit" may be carried by using an information format of the DCI, to avoid extra signaling overheads caused by adding a new field to current DCI.

Specifically, for example, the first DCI indicates whether the second DCI exists. In a possible implementation, if the first DCI sent by the first network device meets a first information format, the first DCI may be used to indicate that the second DCI does not exist in the first time unit. Alternatively, in another possible implementation, if the first DCI sent by the first network device meets a second information format, the first DCI may be used to indicate that the second DCI exists in the first time unit. The first information format is a format, for example, format 1_0; with a minimum quantity of bits in a plurality of DCI formats used for scheduling downlink data transmission, and the second information format is a format whose quantity of bits is greater than that of the first information format in the plurality of DCI formats used for scheduling downlink data transmission.

Figure 7:
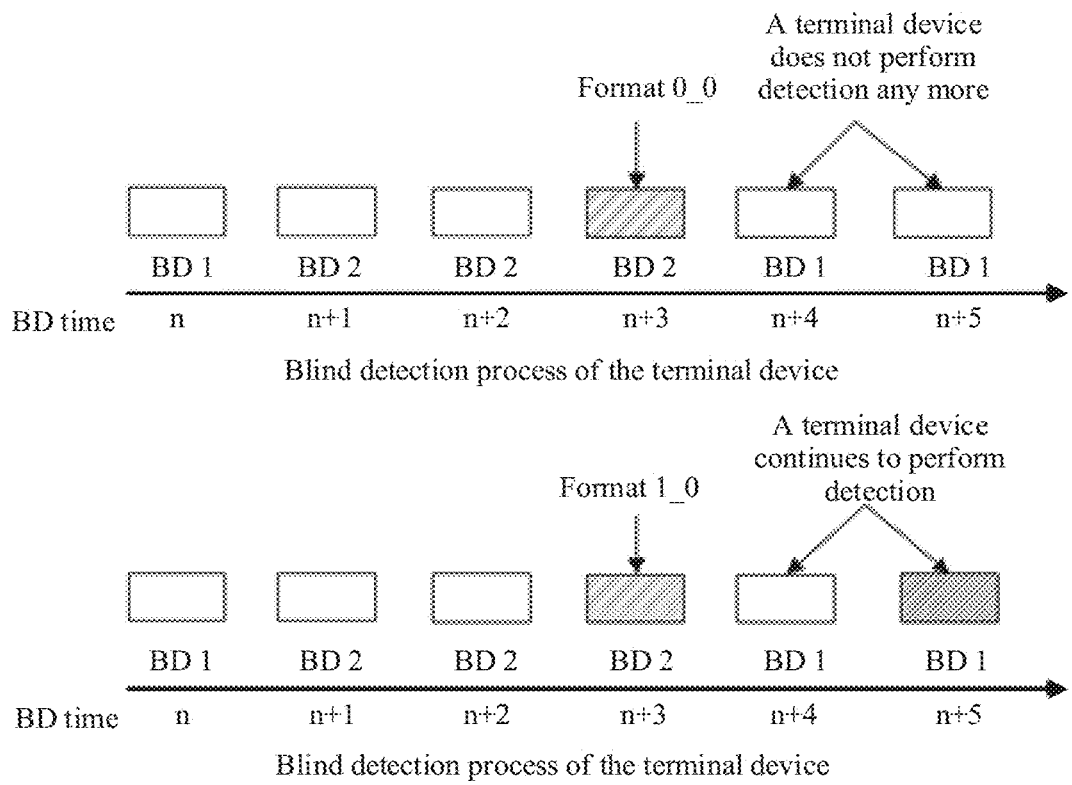
FIG. 7 is a schematic detection flowchart of a terminal device applicable to Implementation 5 according to an embodiment of this application.

In this embodiment of this application, the network device may configure, by using higher layer signaling, the terminal device to detect a maximum of two pieces of DCI, and configure a DCI format currently detected by the terminal device. For each search space, the terminal device may detect a maximum of two DCI formats. Referring to FIG. 7, when the network device configures the terminal device to perform detection on both format 1_0 and format 1_1, if the terminal device detects that the first DCI meets format 1_0, the terminal device may stop detecting the second DCI, This is because DCI format 1_0 is a fallback transmission mode used to enhance robustness. When the terminal device detects DCI format 1_0, the fallback transmission mode does not support CoMP transmission (multi-layer transmission). Therefore, the second DCI does not exist, and there is no need to continue to detect the second DCI. An unnecessary blind detection process may be directly stopped. This reduces blind detection complexity and power consumption of the terminal device, allows the terminal device to perform fast PDSCH demodulation, and avoids extra overheads of the DCI.

It should be understood that, in Implementations 1 to 5, the information indication manner is described only by using an example in which "the first DCI indicates whether the second DCI exists". Because a sequence in which the terminal device blindly detects the search spaces of the terminal device is unknown to the network device, the second DCI also needs to indicate whether the first DCI exists. Therefore, the second DCI may perform an indication in an indication manner that is the same as or similar to that of the first DCI. This is not specifically limited in this embodiment of this application.

In addition, for a problem that the network device does not know which one of the two pieces of DCI is first detected by the terminal device, this embodiment of this application further provides another solution. Specifically, the network device may limit configuration information of search spaces in which the two pieces of DCI are located. For example, DCI that is in the two pieces of DCI and that carries the indication of "whether the other DCI exists" is configured to be sent on a resource with a relatively small search space ID. DCI that does not carry the indication of "whether the other DCI exists" is configured to be sent on a resource with a relatively large search space ID. In this way, the terminal device needs to adaptively perform detection in a blind detection sequence from a search space ID with a smaller ID to a search space ID with a larger ID. When the network device sends two pieces of DCI, only one piece of DCI needs to carry the indication of "whether the other DCI exists", and formats of the two pieces of DCI may be different, so as to achieve a same objective of stopping an unnecessary detection process in advance. For example, one piece of DCI may carry MCS, RV, and NDI fields that indicate two codewords, and the other DCI may only carry MCS, RV, and NDI fields that indicate one codeword.

In this embodiment of this application, when the second DCI exists, and the network device in the coordinating cluster schedules two codewords respectively by using two pieces of DCI, information included in a part of fields in the two pieces of DCI is the same, and the terminal device decodes the two pieces of DCI to obtain repeated information. Herein, the signaling fields indicating same information are referred to as redundant fields. For example, Table 5 shows redundant fields in DCI, that is, same information indicated in two pieces of DCI.

Because the redundant field causes unnecessary DCI overheads, in this embodiment of this application, the first network device may send third indication information, and the third indication information is used to indicate that content indicated by a first field that is in the first DCI is the same as content indicated by a first field that is in the second DCI. The first field is a signaling field included in both the first DCI and the second DCI. In a possible implementation, the third indication information may be indicated by the network device to the terminal device by using higher layer signaling before the network device sends the first DCI and the second DCI, and the third indication information may include a field name of the first field or a corresponding field index value, to represent which fields in existing DCI format 1_1 are first fields. For example, the first field may include a part or all of fields shown in the following Table 5.

In this way, in a possible design, the terminal device may check DCI decoding based on the redundant signaling fields, to help the terminal device determine correctness of detection and decoding. For example, a field A is a redundant field in the DCI. After detecting the first DCI and the second DCI, if the terminal device determines, through decoding, that content indicated by each redundant signaling field that is in the first DCI is the same as content indicated by the redundant signaling field that is in the second DCI, the terminal device may determine that both the first DCI and the second DCI are correctly decoded, and the terminal device may receive the PDSCH based on the indication of the first DCI and the indication of the second DCI. If the terminal device determines, through decoding, that content indicated by the field A that is in the first DCI is different from content indicated by the field A that is in the second DCI, the terminal device may determine that the two pieces of DCI are incorrectly decoded, and stop receiving of the PDSCH this time.

In another possible design, the terminal device may quickly decode the DCI based on the redundant signaling fields. For example, a field B is a redundant field in the DCI. After the terminal device obtains a bit value of the field B that is in one of the two pieces of DCI through decoding, the terminal device may ignore a decoding process of the field B when decoding the other DCI.

TABLE 5

| Redundant field | |
|---|---|
| Redundant field | Bit length |
| Carrier indicator | 0 or 3 bits |
| Bandwidth part (BWP) indication | 0, 1, or 2 bits |
| Mapping from a virtual resource block (VRB) to a physical resource block (PRB) | 0 or 1 bit |
| PRB bundling (size indicator | 0 or 1 bit |
| Rate matching indicator | 0, 1, or 2 bits |
| Zero-power CSI-RS (ZP CSI-RS) triggering | 0, 1, or 2 bits |
| Number of hybrid automatic repeat request (HARQ) processes | 4 bits |
| Downlink assignment index (DAI) | 0, 2, or 4 bits |
| Transmission power control command (TPC command) of a scheduled PUCCH | 2 bits |
| PUCCH resource indication | 3 bits |
| PDSCH-to-HARQ feedback time sequence indicator | 0, 1, 2, or 3 bits |
| SRS request | 2 or 3 bits, used to indicate to trigger aperiodic SRS sending |
| Transmission information of a code block group (CBG) | 0, 2, 4, 6, or 8 bits |
| CBG flushing out | 0 or 1 bit |

Figure 8:
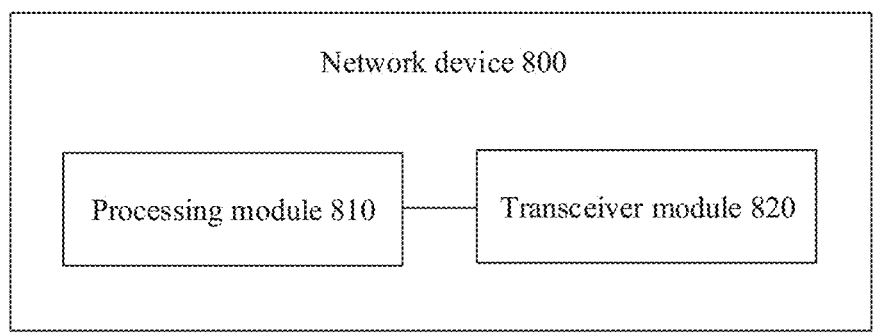
FIG. 8 is a schematic structural diagram of a network device according to an embodiment of this application.

Based on a same inventive concept, an embodiment of this application further provides a network device. FIG. 8 is a schematic structural diagram of a network device 800 according to an embodiment of this application. As shown in FIG. 8, the network device 800 includes a processing module 810 and a transceiver module 820. The processing module 810 is configured to perform the operation of generating, by the network device, the first indication information, the second indication information, or the third indication information in the foregoing method embodiments. The transceiver module 820 is configured to perform the operation of sending the first indication information or the second indication information in the first time unit, or the operation of sending the third indication information in the first time unit. It should be understood that the processing module 810 in this embodiment of the application may be implemented by a processor or a processor-related circuit component, and the transceiver module 820 may be implemented by a transceiver or a transceiver-related circuit component.

Figure 9:
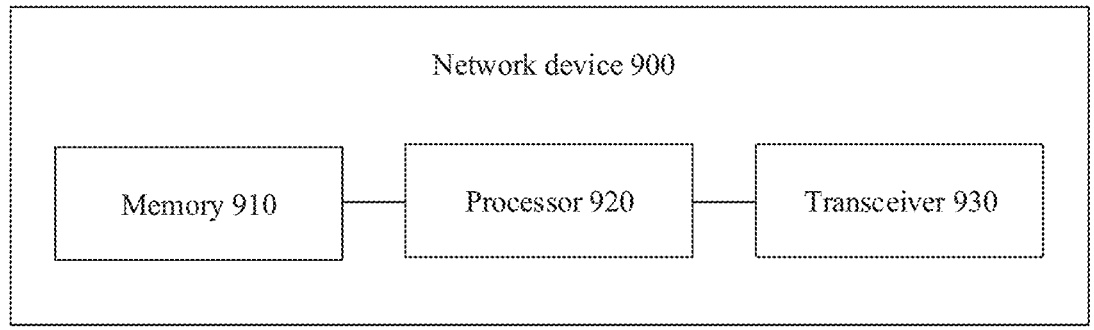
FIG. 9 is a schematic structural diagram of another network device according to an embodiment of this application.

FIG. 9 is another schematic structural diagram of a network device 900 according to an embodiment of this application. As shown in FIG. 9, the network device 900 includes a memory 910, a processor 920, and a transceiver 930. The memory 910 stores an instruction or a program, and the processor 920 is configured to execute the instruction or the program stored in the memory 910. When the instruction or the program stored in the memory 910 is executed, the processor 920 is configured to perform the operation performed by the processing module 820 in the foregoing embodiment, and the transceiver 930 is configured to perform the operation performed by the transceiver module 810 in the foregoing embodiment.

It should be understood that the network device 800 or the network device 900 according to the embodiments of the application may correspond to the first network device in S401 to S403 in the communication method in the embodiments of the application, and operations and/or functions of modules in the network device 800 or the network device 900 are respectively intended to implement corresponding procedures of the method in FIG. 4. For brevity, details are not described herein.

Figure 10:
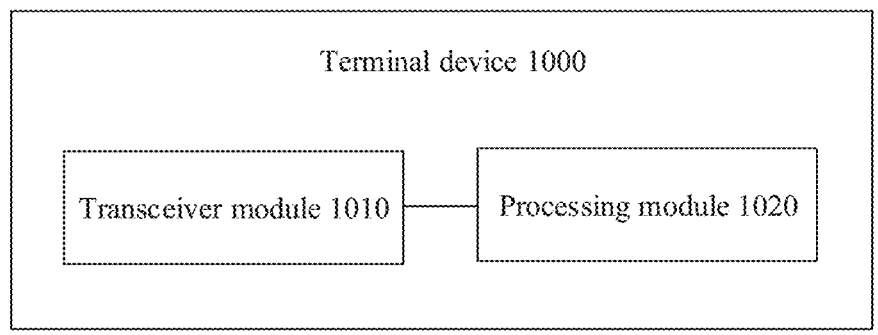
FIG. 10 is a schematic structural diagram of a terminal device according to an embodiment of this application.

An embodiment of this application further provides a terminal device. FIG. 10 is a schematic structural diagram of a terminal device 1000 according to an embodiment of this application. As shown in FIG. 10, the terminal device 1000 includes a transceiver module 1010 and a processing module 1020. The transceiver module 1010 is configured to perform the operation of receiving, by the terminal device, the first indication information, the second indication information, or the third indication information in the first time unit in the foregoing method embodiments. The processing module 1020 is configured to perform the operation in which when the terminal device detects that the first indication information indicates that the second indication information does not exist in the first time unit, the terminal device stops detecting the second indication information in the first time unit in the foregoing method embodiments. Specifically, for how to perform the detection and determine, based on a detection result, whether the first indication information indicates that the second indication information exists in the first time unit, refer to the foregoing method embodiments. Details are not described herein again. It should be understood that the processing module 1010 may be implemented by a processor or a processor-related circuit component, and the transceiver module 1020 may be implemented by a transceiver or a transceiver-related circuit component.

Figure 11:
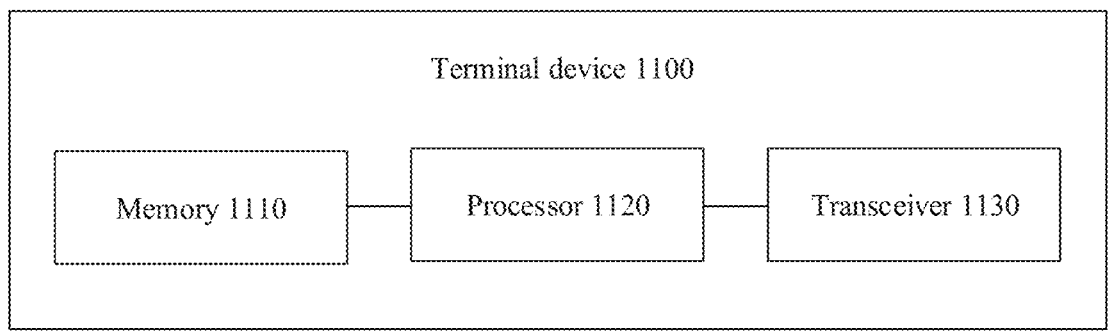
FIG. 11 is a schematic structural diagram of another terminal device according to an embodiment of this application.

FIG. 11 is another schematic structural diagram of a terminal device 1100 according to an embodiment of this application. As shown in FIG. 11, the terminal device 1100 includes a memory 1110, a processor 1120, and a transceiver 1130. The memory 1110 stores an instruction or a program, and the processor 1120 is configured to execute the instruction or the program stored in the memory 1110. When the instruction or the program stored in the memory 1110 is executed, the processor 1120 is configured to perform the operation performed by the processing module 1020 in the foregoing embodiment, and the transceiver 1130 is configured to perform the operation performed by the transceiver module 1010 in the foregoing embodiment.

It should be understood that the terminal device 1000 or the terminal device 1100 according to the embodiments of the application may correspond to the terminal device in S401 to S403 in the communication method in the embodiments of the application, and operations and/or functions of modules in the terminal device 1000 or the terminal device 1100 are respectively intended to implement corresponding procedures of the methods in FIG. 4, FIG. 5, and FIG. 7. For brevity, details are not described herein again.

An embodiment of this application further provides a communications apparatus. The communications apparatus may be a chip, a network device (such as a base station), a terminal device, a circuit, another network device, or the like. The communications apparatus includes one or more processors, and the one or more processors may implement actions performed by the network device or the terminal device side in the method embodiment shown in FIG. 4.

Figure 12:
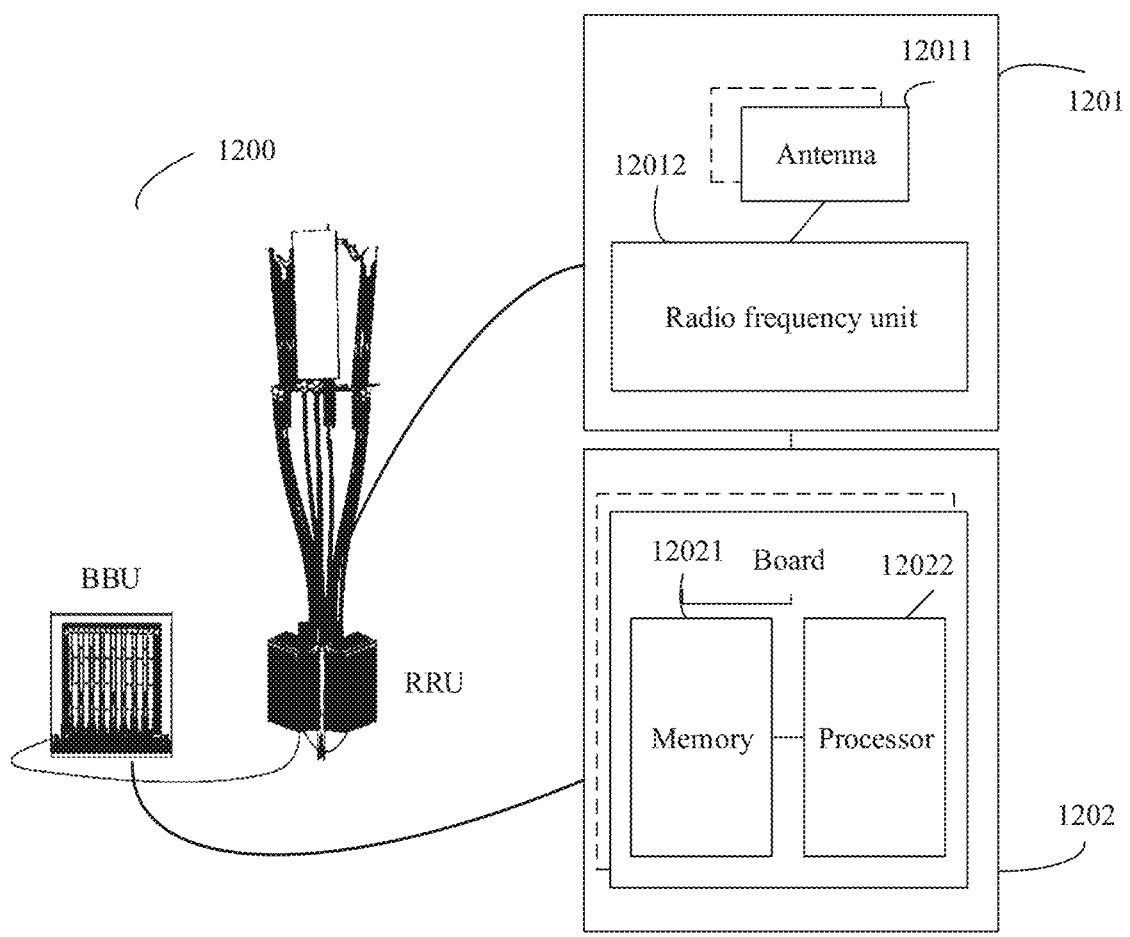
FIG. 12 is a schematic structural diagram of a communications apparatus according to an embodiment of this application.

When the communications apparatus is a network device, FIG. 12 is a schematic structural diagram of a network device. For example, FIG. 12 may be a schematic structural diagram of a base station. As shown in FIG. 12, the base station may be used in the system shown in FIG. 3, to execute the function of the network device in the foregoing method embodiments. A base station 1200 may include one or more radio frequency units, such as remote radio units (RRU) 1201 and one or more baseband units (BBU) (which may also be referred to as digital units, digital unit, DU) 1202. The RRU 1201 may be referred to as a transceiver unit, a transceiver, a transceiver circuit, a transceiver machine, or the like, and may include at least one antenna 12011 and a radio frequency unit 12012. The RRU 1201 part is mainly configured to perform sending and receiving of a radio frequency signal and conversion between a radio frequency signal and a baseband sig al, for example, configured to send the first indication information in the foregoing embodiments to a terminal device. The BBU 1202 part is mainly configured to perform baseband processing, control the base station, and the like. The RRU 1201 and the BBU 1202 may be physically disposed together, or may be physically separated, that is, in a distributed base station.

The BBU 1202 is a control center of the base station, may also be referred to as a processing unit, and is mainly configured to complete baseband processing functions such as channel coding, multiplexing, modulation, and spectrum spreading. For example, The BBU (the processing unit) 1202 may be configured to control the base station to execute the operation procedure related to the network device in the foregoing method embodiments.

In an example, the BBU 1202 may include one or more hoards. A plurality of boards may jointly support a radio access network (such as an LTE network) of a single access standard, or may separately support radio access networks (such as an LTE network, a 5G network, or another network) of different access standards. The BBU 1202 further includes a memory 12021 and a processor 12022. The memory 12021 is configured to store a necessary instruction and necessary data. For example, the memory 12021 stores a correspondence between a codebook index and a precoding matrix in the foregoing embodiments. The processor 12022 is configured to control the base station to perform a necessary action, for example, is configured to control the base station to execute the operation procedure related to the network device in the foregoing method embodiment. The memory 12021 and the processor 12022 may serve the one or more boards. In other words, the memory and processor can be separately set on each board. Alternatively, a plurality of boards may share a same memory and a same processor. In addition, a necessary circuit may be further disposed on each board.

Figure 13:
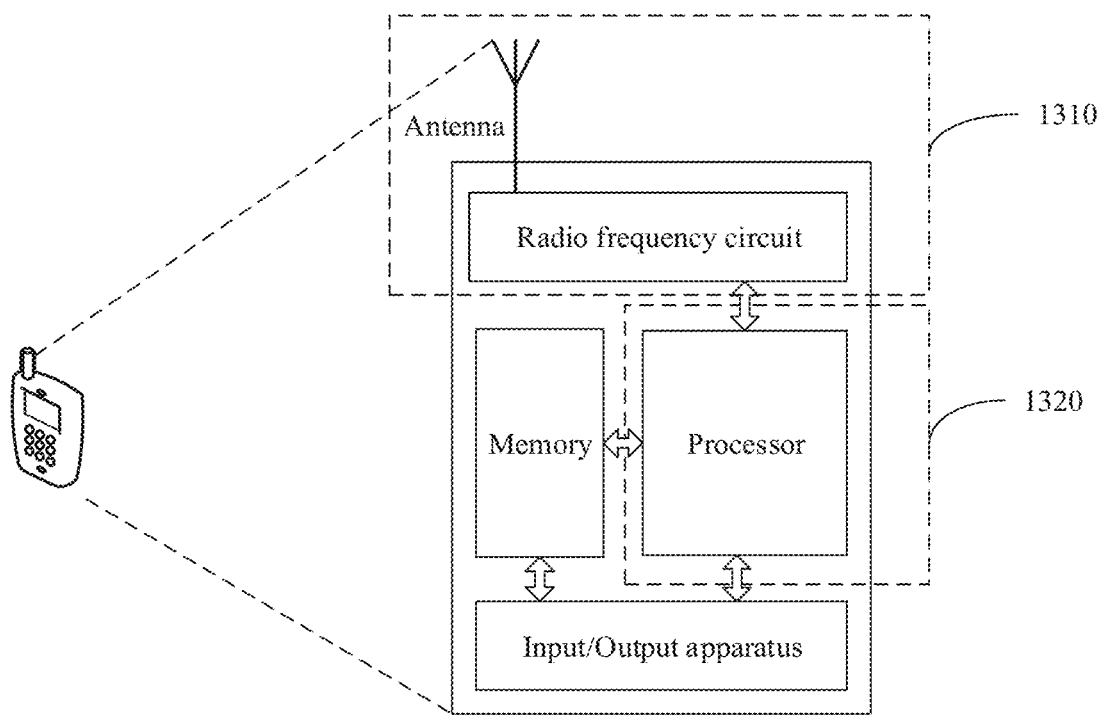
FIG. 13 is another schematic structural diagram of a communications apparatus according to an embodiment of this application.

When the communications apparatus is a terminal device, FIG. 13 is a simplified schematic structural diagram of a terminal device. Fax ease of understanding and convenience of figure illustration, an example in which the terminal device is a mobile phone is used in FIG. 13. As shown in FIG. 13, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to: convert a baseband signal and a radio frequency signal, and process the radio frequency signal. The antenna is mainly configured to transmit and receive a radio frequency signal in an electromagnetic wave form. The input/output apparatus, such as a touchscreen, a display screen, or a keyboard, is mainly configured to receive data input by a user and output data to the user. It should be noted that some types of terminal devices may have no input/output apparatus.

When data needs to be sent, the processor performs baseband processing on to-be-sent data, and then outputs a baseband signal to a radio frequency circuit, After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 13 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 13, the terminal device includes a transceiver unit 1310 and a processing unit 1320. The transceiver unit may also be referred to as a transceiver, a transceiver machine, a transceiver apparatus, or the like. The processing unit may also be referred to as a processor, a processing hoard, a processing module, a processing apparatus, or the like. Optionally, a component that is in the transceiver unit 1310 and that is configured to implement a receiving function may be considered as a receiving unit, and a component that is in the transceiver unit 1310 and that is configured to implement a sending function may be considered as a sending unit. In other words, the transceiver unit 1310 includes the receiving unit and the sending unit. The transceiver unit may also be sometimes referred to as a transceiver machine, a transceiver, a transceiver circuit, or the like. The receiving unit may also be sometimes referred to as a receiving machine, a receiver, a receiver circuit, or the like. The sending unit may also be sometimes referred to as a transmitter machine, a transmitter, a transmitter circuit, or the like.

It should be understood that the transceiver unit 1310 is configured to perform the sending operation and the receiving operation on the terminal device side in the foregoing method embodiments, and the processing unit 1320 is configured to perform the operation other than the receiving and sending operations of the terminal device in the foregoing method embodiments.

For example, in an implementation, the transceiver unit 1310 is configured to perform the sending operation on the terminal device side in step 4, and/or the transceiver unit 1310 is further configured to perform other receiving and sending steps on the terminal device side in the embodiments of this application. The processing unit 1320 is configured to perform step S401 in FIG. 4, and/or the processing unit 1320 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 14:
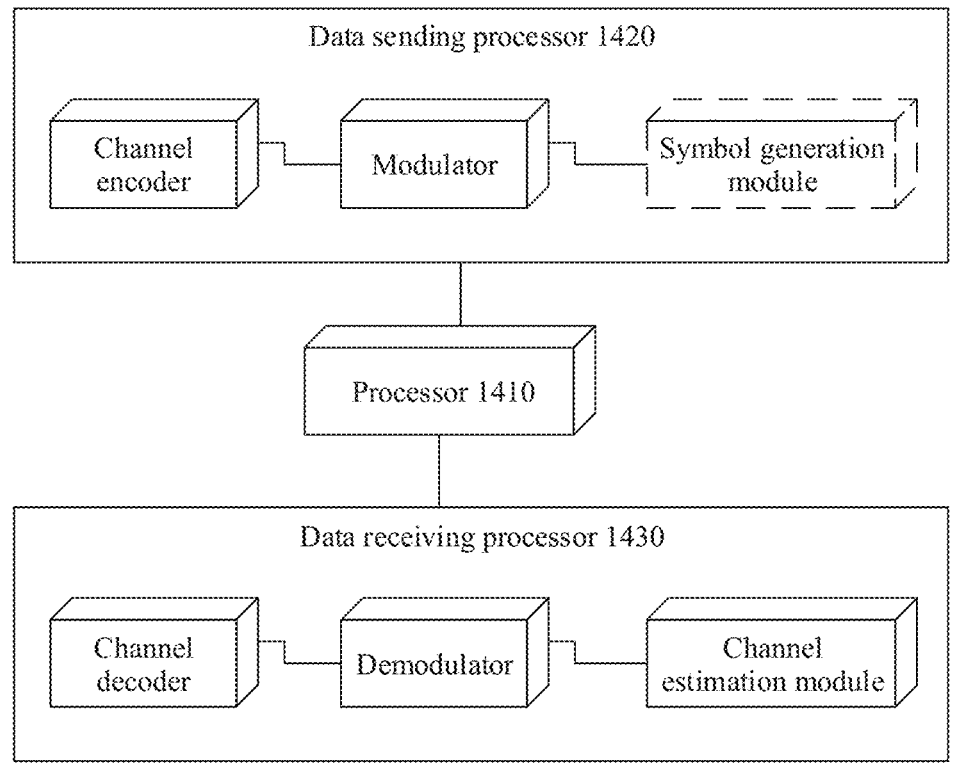
FIG. 14 is still another schematic structural diagram of a communications apparatus according to an embodiment of this application.

When the communications apparatus in this embodiment is a terminal device, reference may be made to a device shown in FIG. 14. In an example, the device may implement a function similar to that of the processor 1120 in FIG. 11. In FIG. 14, the device includes a processor 1410, a data sending processor 1420, and a data receiving processor 1430. The processing module 1020 in the foregoing embodiment may be the processor 1410 in FIG. 14, and completes a corresponding function. The transceiver module 720 in the foregoing embodiment may be the data sending processor 1420 and/or the data receiving processor 1430 in FIG. 14. Although FIG. 14 shows a channel encoder and a channel decoder, it may be understood that these modules do not constitute a limitation on this embodiment and are merely examples.

Figure 15:
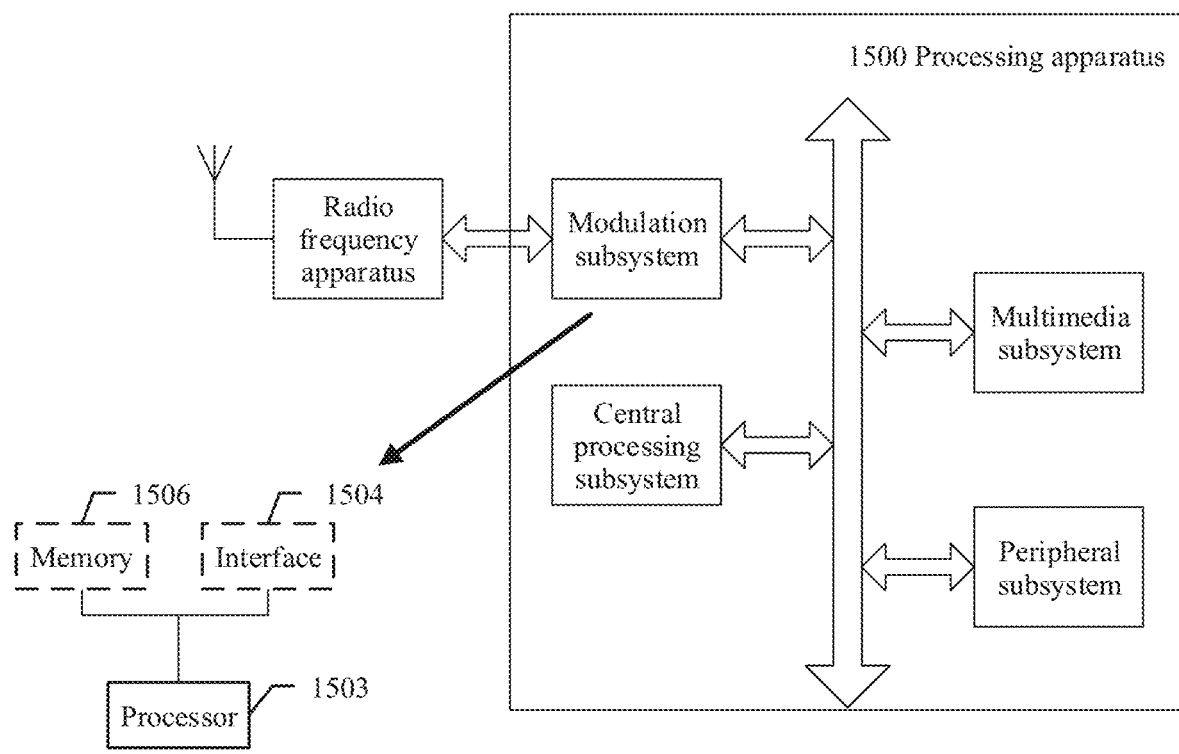
FIG. 15 is yet another schematic structural diagram of a communications apparatus according to an embodiment of this application.

FIG. 15 shows another form of this embodiment. A processing apparatus 1500 includes modules such as a modulation subsystem, a central processing subsystem, and a peripheral subsystem. The communications apparatus in this embodiment may be used as the modulation subsystem in the processing apparatus 1500. Specifically, the modulation subsystem may include a processor 1503 and an interface 1504. The processor 1503 implements the function of the processing module 1020, and the interface 1504 implements the function of the transceiver module 1010. In another variation, the modulation subsystem includes a memory 1506, a processor 1503, and a program that is stored in the memory 1506 and that can run on the processor. When executing the program, the processor 1503 implements the method on the terminal device side in the foregoing method embodiments. It should be noted that the memory 1506 may be nonvolatile or volatile. The memory 1506 may be located in the modulation subsystem, or may be located in the processing apparatus 1500, provided that the memory 1506 can be connected to the processor 1503.

An embodiment of this application further provides a computer-readable storage medium. The computer-readable storage medium stores a computer-readable instruction. When a computer reads and executes the computer-readable instruction, the computer is enabled to perform the method on the network device side in any one of the foregoing method embodiments.

An embodiment of this application provides a computer program product. When a computer reads and executes the computer program product, the computer is enabled to perform the method on the network device side in any one of the foregoing method embodiments.

An embodiment of this application provides a chip. The chip is connected to a memory, and is configured to read and execute a software program stored in the memory, to implement the method on the network device side in any one of the foregoing method embodiments.

An embodiment of this application provides a computer-readable storage medium, where the computer-readable storage medium stores an instruction, and when the instruction is executed, the method on the terminal device side in the foregoing method embodiments is performed.

An embodiment of this application provides a computer program product including an instruction. When the instruction is executed, the method on the terminal device side in the foregoing method embodiments is performed.

An embodiment of this application provides a chip. The chip is connected to a memory, and is configured to read and execute a software program stored in the memory, to implement the method on the terminal device side in any one of the foregoing method embodiments.

An embodiment of this application provides a communications system. The system includes a terminal device and a network device. The terminal device may be configured to perform the method on the terminal device side in any one of the foregoing method embodiments, and the network device may be configured to perform the method on the network device side in any one of the foregoing method embodiments.

It should be understood that, the processor mentioned in the embodiments of this application may be a central processing unit (CPU), the processor may further be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general purpose processor, a DSP, ail ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that the first, second, third, fourth, and various numbers included in this specification are merely distinguished for convenient description, and are not intended to limit the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   generating first indication information, wherein the first indication information indicates a first downlink resource;
   sending third indication information, wherein the third indication information indicates that content indicated by a first field in the first indication information is the same as content indicated by the first field in second indication information, wherein the second indication information indicates a second downlink resource, and wherein the first downlink resource and the second downlink resource are used to carry downlink data; and
   sending the first indication information in a first time unit to a terminal device.

2. The method according to claim 1, wherein the first field comprises at least one of the following:
   a bandwidth part indication, a rate matching indicator, or zero power channel state information reference signal triggering.

3. The method according to claim 1, wherein the first indication information and the second indication information are sent in a same time unit.

4. The method according to claim 1, wherein the first indication information indicates that the second indication information exists in the first time unit, and wherein the method further comprises:
   sending the second indication information in the first time unit, wherein the second indication information indicates that the first indication information exists in the first time unit.

5. The method according to claim 4, wherein the first indication information comprises at least two codeword information fields, wherein each of the at least two codeword information fields indicates whether a corresponding codeword is enabled, and wherein the first indication information indicates that the second indication information exists in the first time unit comprising:
   a part of codewords corresponding to the at least two codeword information fields that are enabled.

6. A communication method, comprising:
   detecting first indication information from a first network device in a first time unit, wherein the first indication information indicates a first downlink resource;
   detecting third indication information from the first network device, wherein the third indication information indicates that content indicated by a first field in the first indication information is the same as content indicated by the first field in second indication information, wherein the second indication information indicates a second downlink resource, and wherein the first downlink resource and the second downlink resource are used to carry downlink data; and
   performing quick decoding on the first indication information and the second indication information based on the first field, or checks correctness of decoding the first indication information and the second indication information.

7. The method according to claim 6, wherein the first field comprises at least one of the following:
   a bandwidth part indication, a rate matching indicator, or zero power channel state information reference signal triggering.

8. The method according to claim 6, wherein the first indication information and the second indication information are sent in a same time unit.

9. The method according to claim 6, wherein the first indication information indicates that the second indication information exists in the first time unit, and wherein the method further comprises:
   detecting the second indication information in the first time unit, wherein the second indication information indicates that the first indication information exists in the first time unit.

10. The method according to claim 9, wherein the first indication information comprises at least two codeword information fields, wherein each of the at least two codeword information fields indicates whether a corresponding codeword is enabled, and wherein the first indication information indicates that the second indication information exists in the first time unit comprising:
    a part of codewords corresponding to the at least two codeword information fields that are enabled.

11. An apparatus, comprising:
    one or more processors; and
    a non-transitory memory storing computer instructions that, when executed by the one or more processors, cause the apparatus to perform operations comprising:
    generating first indication information, wherein the first indication information indicates a first downlink resource;
    sending third indication information, wherein the third indication information indicates that content indicated by a first field in the first indication information is the same as content indicated by the first field in a second indication information, wherein the second indication information indicates a second downlink resource, and wherein the first downlink resource and the second downlink resource are used to carry downlink data; and
    sending the first indication information in a first time unit to a terminal device.

12. The apparatus according to claim 11, wherein the first field comprises at least one of the following:
    a bandwidth part indication, a rate matching indicator, or zero power channel state information reference signal triggering.

13. The apparatus according to claim 11, wherein the first indication information and the second indication information are sent in a same time unit.

14. The apparatus according to claim 11, wherein the first indication information indicates that the second indication information exists in the first time unit, and wherein the apparatus is further caused to perform:
   sending the second indication information in the first time unit, wherein the second indication information is used to indicate that the first indication information exists in the first time unit.

15. The apparatus according to claim 14, wherein the first indication information comprises at least two codeword information fields, wherein each of the at least two codeword information fields indicates whether a corresponding codeword is enabled, and wherein the first indication information indicates that the second indication information exists in the first time unit comprising:
   a part of codewords corresponding to the at least two codeword information fields that are enabled.

* * * * *